US012233868B2

(12) United States Patent
Fujimoto et al.

(10) Patent No.: US 12,233,868 B2
(45) Date of Patent: Feb. 25, 2025

(54) DRIVING-ASSISTANCE CONTROL APPARATUS

(71) Applicant: Mitsubishi Electric Corporation, Tokyo (JP)

(72) Inventors: Tatsuo Fujimoto, Tokyo (JP); Nobuyoshi Tomomatsu, Tokyo (JP); Takuma Kusagaki, Tokyo (JP); Taiga Tanaka, Tokyo (JP); Tatsuji Irie, Tokyo (JP); Wataru Tsujita, Tokyo (JP); Kenzo Makino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 370 days.

(21) Appl. No.: 17/733,376

(22) Filed: Apr. 29, 2022

(65) Prior Publication Data

US 2022/0402488 A1 Dec. 22, 2022

(30) Foreign Application Priority Data

Jun. 21, 2021 (JP) .................................. 2021-102158

(51) Int. Cl.
*B60W 30/14* (2006.01)
*A42B 3/04* (2006.01)
(Continued)

(52) U.S. Cl.
CPC ......... *B60W 30/143* (2013.01); *A42B 3/0433* (2013.01); *B60W 10/06* (2013.01);
(Continued)

(58) Field of Classification Search
CPC .... B60W 30/143; B60W 10/06; B60W 10/11; B60W 2300/36; B60W 2520/06;
(Continued)

(56) References Cited

U.S. PATENT DOCUMENTS

2011/0160976 A1* 6/2011 Matsuda ................. B60T 8/175
701/70
2015/0127240 A1* 5/2015 Nozawa ................. B60T 8/175
701/82

(Continued)

FOREIGN PATENT DOCUMENTS

| JP | 2012173253 A | * | 9/2012 |
| JP | 5369999 B2 | | 12/2013 |
| JP | 2017178284 A | * | 10/2017 |

*Primary Examiner* — Hunter B Lonsberry
*Assistant Examiner* — Helen Li
(74) *Attorney, Agent, or Firm* — Sughrue Mion, PLLC

(57) ABSTRACT

The objective is to improve driving feeling at a time of acceleration operation or deceleration operation, by recognizing driver's intention of acceleration or deceleration during straight-ahead running. A driving-assistance control apparatus according to the present disclosure includes
 a straight-running determination unit that determines whether or not a vehicle is running straight,
 a head-position detection unit that detects a head position of a driver,
 a driving-posture determination unit that determines the posture of the driver, based on the head position detected by the head-position detection unit, and
 a driving-assistance control unit that performs acceleration preparation control for raising a reaction speed for acceleration operation or deceleration preparation control for raising a reaction speed for deceleration operation in accordance with an output of the driving-posture determination unit, when the straight-running determination unit determines that a vehicle is running straight.

16 Claims, 13 Drawing Sheets

(51) Int. Cl.
  *B60W 10/06* (2006.01)
  *B60W 10/11* (2012.01)
  *B62J 45/20* (2020.01)
  *B62J 45/415* (2020.01)
  *F02D 33/00* (2006.01)
  *F02D 33/02* (2006.01)

(52) U.S. Cl.
  CPC .............. *B60W 10/11* (2013.01); *B62J 45/20* (2020.02); *B62J 45/415* (2020.02); *F02D 33/003* (2013.01); *F02D 33/02* (2013.01); B60W 2300/36 (2013.01); B60W 2520/06 (2013.01); B60W 2520/18 (2013.01); B60W 2710/0622 (2013.01); B60W 2710/1005 (2013.01); B60W 2720/106 (2013.01)

(58) Field of Classification Search
  CPC ..... B60W 2520/18; B60W 2710/0622; B60W 2710/1005; B60W 2720/106; B62J 45/415; B62J 45/20; A42B 3/0433; F02D 33/003; F02D 33/02
  USPC .......................................................... 701/93
  See application file for complete search history.

(56) References Cited

U.S. PATENT DOCUMENTS

2021/0349465 A1* 11/2021 Gillett .................... B60K 17/30
2022/0169239 A1* 6/2022 Nose ........................ G08G 1/16

* cited by examiner

DRIVING-ASSISTANCE CONTROL APPARATUS

TECHNICAL FIELD

The present disclosure relates to a driving-assistance control apparatus.

BACKGROUND

Because most of saddle-type vehicles such as motorcycles are highly hobby-oriented and palatability-oriented, it is required that the vehicle promptly reacts to driver's operation. That is to say, high responsiveness to driver's operation is required. Accordingly, a delay with respect to driver's operation poses a problem. For example, in the case where a driver performs accelerating operation, a control apparatus detects the driver's operation in accordance with a change in the sensor value of an accelerator position sensor mounted in the vehicle and then outputs control signals to an electronically-controlled throttle, a fuel injection apparatus, and an ignition apparatus, which are control subjects. Various kinds of loads are driven by the output of the control apparatus, so that the operating state of the vehicle changes. Because in the interval from a time of driver's operation to a time when the behavior of the vehicle actually changes, there is caused a response delay of several hundreds milliseconds, the driver may feel, as a bodily sensation, that the reaction is slow.

There exists a control apparatus for raising the reaction speed of a saddle-type vehicle so that the steerability and the comfortability thereof are enhanced. There has been disclosed a technology in which based on a shift of the gravity center caused by a driver's bodily behavior, a control apparatus controls the vehicle body. The control apparatus detects the shift of the gravity center, so that the driver's intention of turning is recognized. When the driver's intention of turning is recognized, the control apparatus makes vehicle-body inclination start. Because when the driver performs steering operation for turning operation, the vehicle-body inclination has been started, it is made possible that the turning performance of the vehicle at a time of turning driving is raised and hence the comfortability is enhanced (e.g., Patent Document 1).

CITATION LIST

Patent Literature

Patent Document 1: Japanese Patent No. 5369999

In a saddle-type vehicle such as a motorcycle, the intention of a driver at a time of turning is conspicuously reflected in a shift of the gravity center. However, the shift of the gravity center at a time of acceleration operation or deceleration operation during straight-ahead running is small in comparison with the shift thereof during turning. Accordingly, at a time of straight-ahead running, it is difficult to preliminarily recognize driver's intention of acceleration or deceleration, based on the shift of the gravity center. Therefore, to date, it has been difficult to recognize driver's intention of acceleration or deceleration during straight-ahead running so as to improve the driving feeling.

SUMMARY

The present disclosure has been implemented in order to solve the foregoing problem; the objective thereof is to improve the driving feeling by recognizing driver's intention of acceleration or deceleration during straight-ahead running and then by raising the reaction speed for acceleration operation or deceleration operation.

Solution to Problem

A driving-assistance control apparatus according to the present disclosure includes
a straight-running determination unit that determines whether or not a vehicle is running straight,
a head-position detection unit that detects a head position of a driver,
a driving-posture determination unit that determines the posture of the driver, based on the head position detected by the head-position detection unit, and
a driving-assistance control unit that performs acceleration preparation control for raising a reaction speed for acceleration operation or deceleration preparation control for raising a reaction speed for deceleration operation in accordance with an output of the driving-posture determination unit, when the straight-running determination unit determines that a vehicle is running straight.

Advantageous Effects

The driving-assistance control apparatus according to the present disclosure makes it possible to improve the driving feeling by recognizing driver's intention of acceleration or deceleration during straight-ahead running and then by raising the reaction speed for acceleration operation or deceleration operation.

The foregoing and other object, features, aspects, and advantages of the present invention will become more apparent from the following detailed description of the present invention when taken in conjunction with the accompanying drawings.

DESCRIPTION OF EMBODIMENTS

Figure 1:
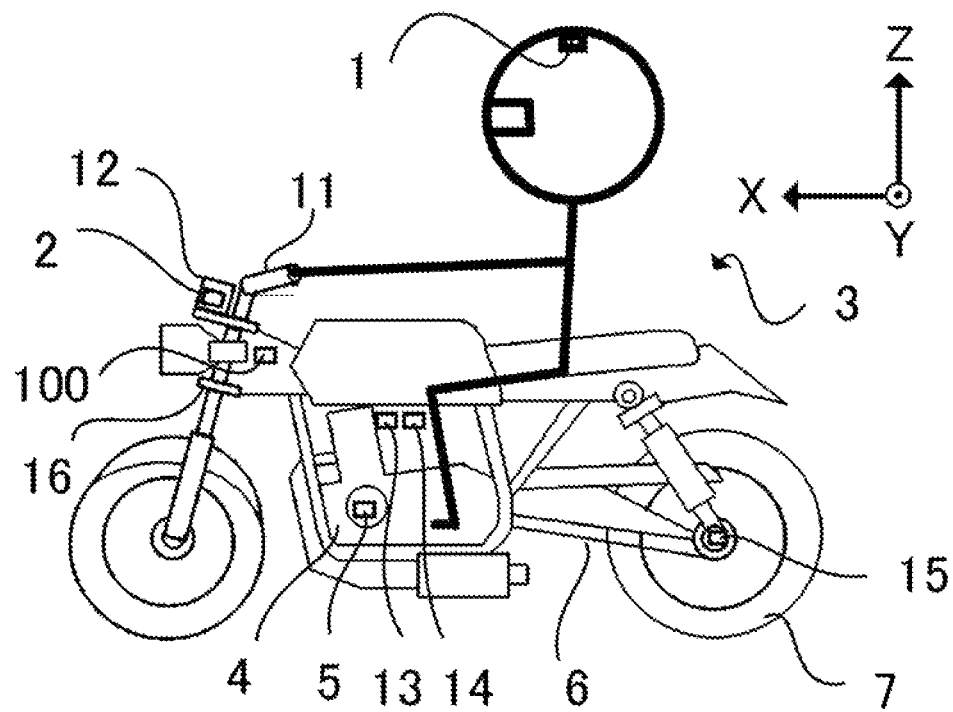
FIG. 1 is a left-side view of a vehicle in which a driving-assistance control apparatus according to Embodiment 1 is mounted.

Hereinafter, a preferred embodiment will be explained in detail with reference to the drawings. The same or equivalent constituent elements will be designated by the same reference characters, and the detailed explanations therefor will be omitted. In each of the other embodiments following the above embodiment, duplicated explanations for the configurations with the same reference characters will be omitted.

1. Embodiment 1

<Configuration of Vehicle>

FIG. 1 is a left-side view of a state where a driver is riding a vehicle 3 in which a driving-assistance control apparatus 100 according to Embodiment 1 is mounted. The vehicle 3 is a saddle-type vehicle that travels by transferring driving power generated in an internal combustion engine 4 as a driving power source to a rear wheel 7 by way of a transmission 5 and a drive chain 6. FIG. 1 illustrates an example in which the vehicle 3 is a motorcycle. However, the technology according to Embodiment 1 can be applied also to a three-wheeled vehicle or a four-wheeled vehicle, as far as it is a saddle-type vehicle.

A steering handle 11 is provided in the vehicle 3. A meter device 12 for displaying information items such as a speed and a distance is disposed close to the steering handle 11. The vehicle 3 is provided with a gyroscopic sensor 13 that can detect a roll angle, a pitch angle, a yaw angle, and the like of the vehicle and with an inclination angle sensor 14 that detects an inclination of the vehicle. The rear wheel 7 is provided with a vehicle speed sensor 15 that can detect a rotation speed of the rear wheel 7.

The driving-assistance control apparatus 100 is disposed below the meter device 12. The driving-assistance control apparatus 100 may be integrated with a fuel-injection control apparatus 26, an ignition timing control apparatus 24, an electronically-controlled throttle control apparatus 25, a fuel pump control apparatus 27 for controlling the internal combustion engine 4, a transmission control apparatus 28 for controlling the transmission, and the like (the fuel-injection control apparatus 26, the ignition timing control apparatus 24, the electronically-controlled throttle control apparatus 25, the fuel pump control apparatus 27, and the transmission control apparatus 28 are not illustrated in FIG. 1). A head-position indicator 1 is provided in the top portion of a helmet to be worn by a driver, and a head-position sensor 2 is provided in the central portion of the steering handle 11; the head-position display device 1 and the head-position sensor 2 communicate with each other and can mutually recognize the other's position.

X-Y-Z denotes a vehicle coordinate system with the vehicle 3 as a reference. Each of these coordinate systems is a right-handed system. The origin of X-Y-Z is set to the gravity center of the vehicle 3; however, in each of FIGS. 1 through 3, for the sake of easy viewing, the origin is illustrated at a position different from the gravity center of the vehicle 3. X denotes the anteroposterior direction (the arrow is oriented forward) that passes through the gravity center of the vehicle body; Y denotes the left-and-right direction (the arrow is oriented to the left side) that passes through the gravity center of the vehicle body; Z denotes the vertical directions (the arrow is oriented to the upper side) that passes through the gravity center of the vehicle body.

The yaw angle is a rotation angle around the Z axis. When turning, the vehicle turns to the right or to the left around the Z axis. In this regard, however, when turning, a saddle-type vehicle turns while generating rolling. While the vehicle 3 runs, rolling that pivots on the X axis is generated. This rolling is referred to as bank and is an important element at a time when a saddle-type vehicle turns.

The roll angle is a rotation angle around the X axis. In addition, the pitch angle is a rotation angle around the Y axis. The positive direction on the X axis is the forward direction of the vehicle 3; the positive direction on the Y axis is the left-side direction of the vehicle 3; the positive direction on the Z axis is the upper-side direction of the vehicle 3. FIG. 1 illustrates a case where the vehicle 3 stands erect with respect to a horizontal ground. In this situation, the negative direction of the Z axis coincides with the gravity direction.

Figure 2:
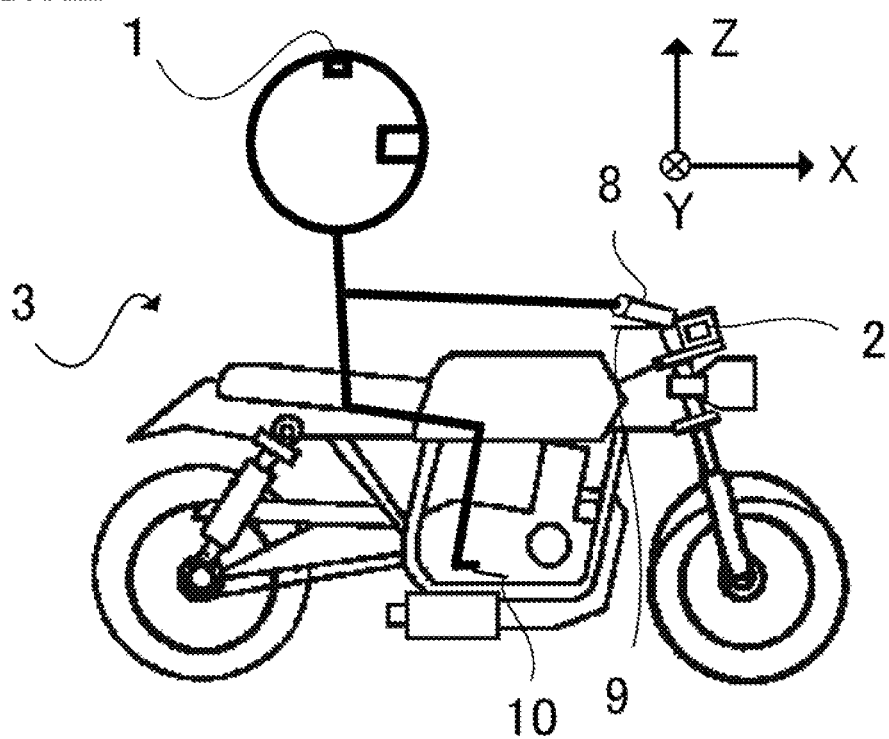
FIG. 2 is a right-side view of the vehicle in which the driving-assistance control apparatus according to Embodiment 1 is mounted.

FIG. 2 is a right-side view of a state where the driver is riding the vehicle 3 in which the driving-assistance control apparatus 100 according to Embodiment 1 is mounted. The vehicle 3 is provided with an accelerator 8, a front wheel brake 9, and a rear wheel brake 10. X-Y-Z denotes a vehicle coordinate system with the vehicle 3 as a reference. FIG. 2 illustrates a case where the vehicle 3 stands erect with respect to the horizontal ground.

Figure 3:
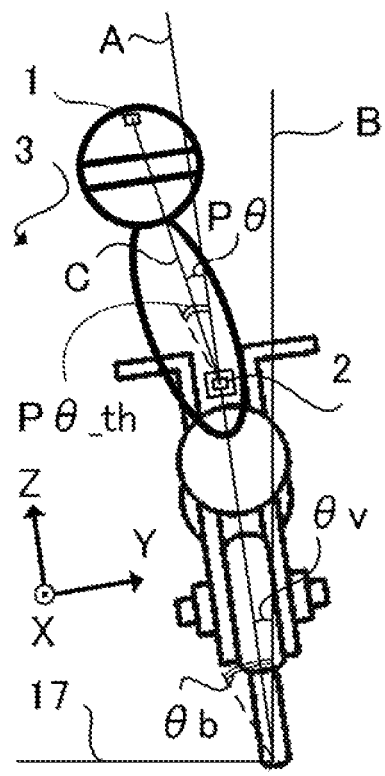
FIG. 3 is a front view of the vehicle in which the driving-assistance control apparatus according to Embodiment 1 is mounted.

FIG. 3 is a front view of the vehicle 3 in which the driving-assistance control apparatus 100 according to Embodiment 1 is mounted and that is being ridden by a driver. X-Y-Z denotes a vehicle coordinate system with the vehicle 3 as a reference. FIG. 3 illustrates a case where the vehicle 3 is inclined by a roll angle $\theta v$ with respect to a perpendicular line B, which is the gravity direction. The perpendicular line B is perpendicular to a horizontal road surface 17. A vertical-direction center line A of the vehicle 3 is in parallel with the Z axis of the vehicle coordinate system. In many cases, when the vehicle 3 is rolling, turning operation is being performed. Accordingly, in the case where the value (absolute value) of the roll angle $\theta v$ exceeds a predetermined determination roll angle $\theta b$, it can be presumed that the turning operation is being performed.

In FIG. 3, the vehicle 3 is banking (rolling) to the right; in order to bank the vehicle 3, the driver is inclining his body further to the right from the center line A. Based on an angle, viewed from the front, between the center line A of the vehicle 3 and a head-position straight line C, which connects the position of the head-position indicator 1 provided in the top portion of the driver's helmet with the position of the head-position sensor 2 provided in the central portion of the steering handle 11 of the vehicle 3, there can be ascertained a state where the driver's posture moves in the left-and-right direction. This angle will be referred to as a left-and-right posture moving angle Pθ.

It can be said that the left-and-right posture moving angle Pθ is an angle between the vertical-direction center line A of the vehicle 3 and a straight line obtained by projecting the head-position straight line C, which connects the position of the head-position indicator 1 with the position of the head-position sensor 2, on a plane perpendicular to the X axis of the vehicle. Depending on the turning radius, the turning speed, the extent of road-surface gripping force, the necessity of securing forward visibility, and the like at a time of turning, the posture of the driver moves toward the inner side (turning side) or toward the outer side (anti-turning side) with respect to the vertical-direction center line A of the vehicle 3. However, in many cases, when the posture moves, the turning operation is performed. Accordingly, in the case where the value (absolute value) of the left-and-right posture moving angle Pθ exceeds a predetermined determination left-and-right posture moving angle Pθ_th, it can be presumed that the driver of the vehicle 3 is performing the turning operation.

<Hardware Configuration of Driving-Assistance Control Apparatus>

Figure 4:
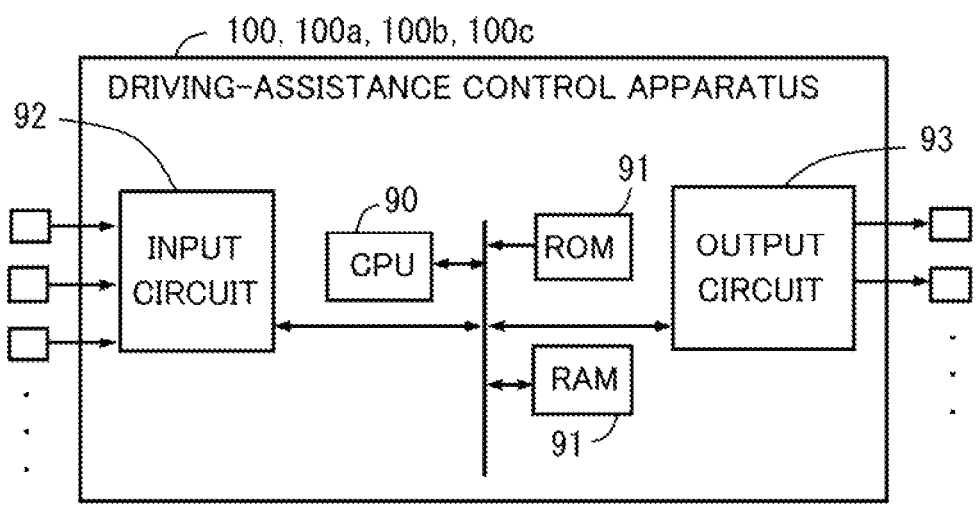
FIG. 4 is a hardware configuration diagram of the driving-assistance control apparatus according to Embodiment 1.

FIG. 4 is a hardware configuration diagram of the driving-assistance control apparatus 100. The hardware configuration in FIG. 4 can be applied also to each of driving-assistance control apparatuses 100a, 100b and 100c. In addition, the foregoing hardware configuration can be applied also to the fuel-injection control apparatus 26, the ignition timing control apparatus 24, the electronically-controlled throttle control apparatus 25, the fuel pump control apparatus 27, and the transmission control apparatus 28. Hereinafter, as the representative, the driving-assistance control apparatus 100 will be explained. In the present embodiment, the driving-assistance control apparatus 100 is a control apparatus that assists a driver to perform acceleration operation or deceleration operation for the vehicle 3. Respective functions of the driving-assistance control apparatus 100 are realized by processing circuits provided in the driving-assistance control apparatus 100. Specifically, the driving-assistance control apparatus 100 includes, as the processing circuits, a computing processing unit (computer) 90 such as a CPU (Central Processing Unit), storage apparatuses 91 that exchange data with the computing processing unit 90, an input circuit 92 that inputs external signals to the computing processing unit 90, an output circuit 93 that outputs signals from the computing processing unit 90 to the outside, and the like.

It may be allowed that as the computing processing unit 90, an ASIC (Application Specific Integrated Circuit), an IC (Integrated Circuit), a DSP (Digital Signal Processor), an FPGA (Field Programmable Gate Array), each of various kinds of logic circuits, each of various kinds of signal processing circuits, or the like is provided. In addition, it may be allowed that as the computing processing unit 90, two or more computing processing units of the same type or different types are provided and respective processing items are executed in a sharing manner. As the storage apparatuses 91, there are provided a RAM (Random Access Memory) that can read data from and write data in the computing processing unit 90, a ROM (Read Only Memory) that can read data from the computing processing unit 90, and the like.

As the storage apparatus 91, a nonvolatile or volatile semiconductor memory such as a flash memory, an EPROM, or an EEPROM, a magnetic disk, a flexible disk, an optical disk, a compact disk, a minidisk, a DVD, or the like may be utilized. The input circuit 92 is connected with a sensor group 30, various kinds of sensors and switches including the output signal of the head-position sensor 2, and communication lines and is provided with an A/D converter, a communication circuit, and the like for inputting output signals from these sensors and switches and communication information to the computing processing unit 90. The output circuit 93 is provided with, for example, a driving circuit for outputting a control signal from the computing processing unit 90 to a driving apparatus. Moreover, the control can be performed by sending a signal to another control apparatus through the output circuit 93.

The computing processing unit 90 executes software items (programs) stored in the storage apparatus 91 such as a ROM and collaborates with other hardware devices in the driving-assistance control apparatus 100, such as the storage apparatus 91, the input circuit 92, and the output circuit 93, so that the respective functions provided in the driving-assistance control apparatus 100 are realized. It may be allowed that programs are inputted from the storage apparatus 91 to the computing processing unit 90 by way of a volatile storage device. Moreover, it may be allowed that the computing processing unit 90 outputs data such as a calculation result to the volatile storage device of the storage apparatus 91. Furthermore, it may be allowed that data is stored in a nonvolatile storage through the volatile storage device. In addition, setting data items such as a threshold value and a determination value to be utilized in the driving-assistance control apparatus 100 are stored, as part of software items (programs), in the storage apparatus 91 such as a ROM. It may be allowed that the respective functions included in the driving-assistance control apparatus 100 are configured with either software modules or combinations of software and hardware.

<Configuration of Driving Assistance Apparatus>

Figure 5:
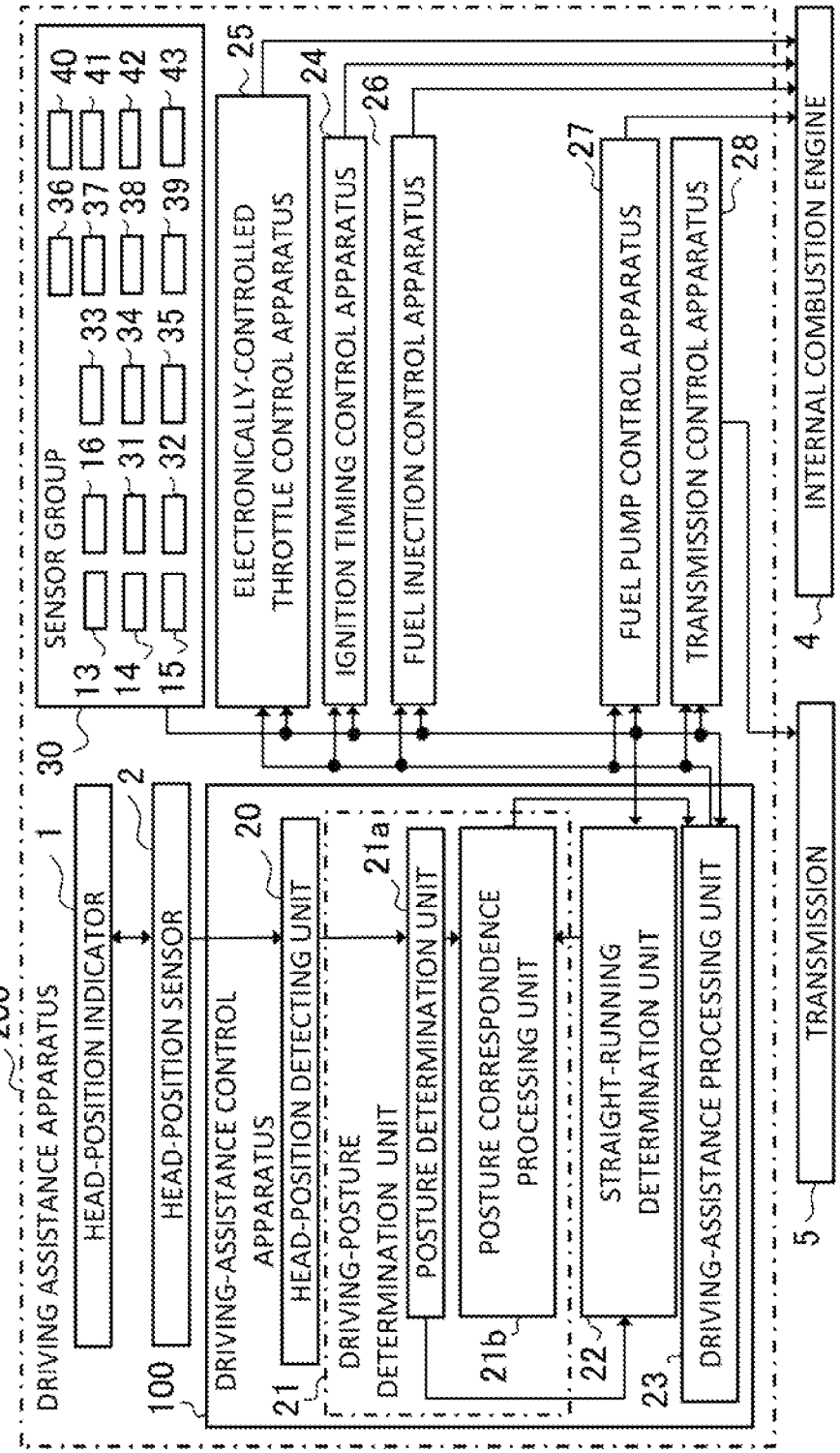
FIG. 5 is a first configuration diagram of a driving assistance apparatus according to Embodiment 1.

FIG. 5 is a first configuration diagram of a driving assistance apparatus 200 according to Embodiment 1. FIG. 5 represents the relationship among the driving assistance apparatus 200, the internal combustion engine 4, and the transmission 5, by use of a block diagram. Based on inputted information, the driving-assistance control apparatus 100 provided in the driving assistance apparatus 200 determines whether the driver is in a forward-inclined posture or in a backward-inclined posture at a time of straight-ahead running of the vehicle 3.

After that, the driving-assistance control apparatus 100 determines acceleration intention from a forward-inclined posture of the driver and then outputs an acceleration-preparation-control command for raising the reaction speed of the vehicle for the acceleration operation. In addition, the driving-assistance control apparatus 100 determines deceleration intention from a backward-inclined posture of the driver and then outputs a deceleration-preparation-control command for raising the reaction speed of the vehicle for the deceleration operation.

The acceleration-preparation-control command and the deceleration-preparation-control command are transferred to the fuel-injection control apparatus 26, the ignition timing control apparatus 24, the electronically-controlled throttle control apparatus 25, the fuel pump control apparatus 27, and the transmission control apparatus 28. The driving assistance apparatus 200 includes the driving-assistance control apparatus 100 and various kinds of control apparatuses.

The fuel-injection control apparatus 26, the ignition timing control apparatus 24, the electronically-controlled throttle control apparatus 25, the fuel pump control apparatus 27, and the transmission control apparatus 28 receive respective sensor information items from the sensor group 30 and then calculate respective normal control amounts so as to control the internal combustion engine 4 and the transmission 5. Then, based on the command from the driving-assistance control apparatus 100, each of the fuel-injection control apparatus 26, the ignition timing control apparatus 24, the electronically-controlled throttle control apparatus 25, and the fuel pump control apparatus 27 controls the internal combustion engine 4 for acceleration preparation or deceleration preparation. Based on the command from the driving-assistance control apparatus 100, the transmission control apparatus 28 controls the transmission 5 for the acceleration preparation or the deceleration preparation.

<Respective Functions of Units in Driving-Assistance Control Apparatus>

FIG. 5 describes respective functional blocks of the driving-assistance control apparatus 100. Hereinafter, respective functions of the units will be explained.

<Head-Position Detection Unit>

The head-position sensor 2 communicates with the head-position indicator 1 and transfers information on the positional relationship therebetween to a head-position detection unit 20 of the driving-assistance control apparatus 100. The head-position indicator 1 is provided at a position on the central line that passes through the head-top portion and the forehead of the helmet to be worn by a driver. The head-position sensor 2 is provided close to the central portion of the steering handle 11. The head-position sensor 2 may be provided inside the meter device 12. The head-position sensor 2 may be provided in any other place than the foregoing places, as far as it is situated at a position where at a time of driving, the range from the head-position sensor 2 to the head-position indicator 1 can be seen through without any obstacle in a space where electric waves propagate.

As each of the head-position indicator 1 and the head-position sensor 2, there can be utilized an apparatus that has a distance-measurement function and an angle-measurement function in addition to a communication function. Specifically, it may be allowed that a Bluetooth communication apparatus or an UWB (ultra-wideband) communication apparatus is utilized. The head-position detection unit 20 in the driving-assistance control apparatus 100 detects a driver's head position in a vehicle-ahead direction, based on information items related to an electric-wave arrival angle and an electric-wave strength.

Two or more head-position sensors 2 may be provided corresponding to the head-position indicator 1. The reason for that is because measurement through triangulation makes it possible to perform accurate position detection. In that case, it is not required to dispose the head-position sensor 2 close to the central portion of the steering handle 11. Even in that case, it is desirable that the position is located with a reference of a place, such as the central portion of the steering handle 11 of the vehicle 3, that is readily compared. The method for position measurement is not limited to that utilizing an electric wave. The position measurement may be performed based on image information obtained by means of ultrasound-, laser-, or camera-photographing.

<Driving-Posture Determination Unit>

A driving-posture determination unit 21 includes a posture determination unit 21a and a posture correspondence processing unit 21b. Hereinafter, the units will be explained individually.

<Posture Determination Unit>

The posture determination unit 21a determines the posture of a driver, based on the driver's head position obtained by the head-position detection unit 20. The posture of the driver is quantified by the distance between the head-position indicator 1 and the head-position sensor 2, the angle of the head-position indicator 1 with respect to the head-position sensor 2, and the like.

The distance between the head-position indicator 1 and the head-position sensor 2 will be referred to as a head-vehicle distance Pd. The left-and-right posture moving angle P$\theta$ is an angle between the vertical-direction center line A of the vehicle 3 and a line obtained by projecting the head-position straight line C, which connects the position of the head-position indicator 1 with the position of the head-position sensor 2, on a plane perpendicular to the X axis of the vehicle.

The posture determination unit 21a determines the driving posture of the driver, by comparing the head-vehicle distance Pd with a predetermined forward-inclination determination value Pd_th1 and by comparing the head-vehicle distance Pd with a predetermined backward-inclination determination value Pd_th2. Based on the comparison result, the posture determination unit 21a determines in which posture among the forward-inclined posture, the basic posture, and the backward-inclined posture the driver is.

<Straight-Running Determination Unit>

Based on the left-and-right posture moving angle P$\theta$ calculated by the posture determination unit 21a, the straight-running determination unit 22 determines whether or not the driver is performing turning operation. When the value (absolute value) of the left-and-right posture moving angle P$\theta$ is within the predetermined determination left-and-right posture moving angle P$\theta$_th, it can be determined that the driver has not started the turning operation and the vehicle is running straight.

Furthermore, the straight-running determination unit 22 receives information from the sensor group 30 provided in the vehicle 3. The sensor group 30 may include the gyroscopic sensor 13, the inclination angle sensor 14, the vehicle speed sensor 15, a steering angle sensor 16, an air flow sensor 31, an internal-combustion-engine rotation speed sensor 32, a coolant temperature sensor 33, an intake-air temperature sensor 34, a shift-stage sensor 35, an oil temperature sensor 36, an oil pressure sensor 37, a GPS signal 38, a navigation device signal 39, an accelerator position sensor 40, a throttle opening degree sensor 41, a brake-pedal sensor 42, a brake-lever sensor 43, and the like.

The straight-running determination unit 22 detects the roll angle $\theta$v from a signal of the inclination angle sensor 14. Then, in the case where the value (absolute value) of the roll angle $\theta$v exceeds the predetermined determination roll angle $\theta$b, it can be determined that the turning operation is being performed; in the case where the value of the roll angle $\theta$v is the same as or smaller than the determination roll angle $\theta$b, it can be determined that the vehicle is running straight. It may be allowed that the roll angle $\theta$v is detected by use of the gyroscopic sensor 13 or GPS signal 38.

It may be allowed that the straight-running determination unit 22 determines that the vehicle is running straight from a signal of the steering angle sensor 16, without utilizing the left-and-right posture moving angle P$\theta$ and the roll angle $\theta$v.

Alternatively, it may be allowed that the straight-running determination unit 22 determines that the vehicle is running straight by use of the signal of the steering angle sensor 16 in addition to the left-and-right posture moving angle Pθ and the roll angle θv. In a saddle-type vehicle, start of turning can rapidly and accurately be determined by utilizing the roll angle θv indicating a bank angle of the vehicle body and the left-and-right posture moving angle Pθ indicating a change in the posture of the driver; thus, the reliability of the determination during straight running can be raised.

Only when it is determined that the vehicle is running straight, the straight-running determination unit 22 determines whether or not the acceleration preparation control is required, based on the forward-inclined posture of the driver. Moreover, only when it is determined that the vehicle is running straight, the straight-running determination unit 22 determines whether or not the deceleration preparation control is required, based on the backward-inclined posture of the driver. The reason for that is because in the case where the vehicle is not running straight, i.e., in the case where the driver is turning or trying to turn the vehicle, the posture of the driver moves in the left-and-right direction and hence it becomes difficult to determine whether the driver is in the forward-inclined posture or in the backward-inclined posture.

In addition, rapid acceleration or rapid deceleration during turning operation is not recommended. The reason for that is because a rapid change in the torque exerted to the wheel also causes a change in the gripping force of the tire and hence the controllability of the vehicle 3 may be deteriorated. Accordingly, it is desired that the acceleration preparation control for raising the reaction speed of the vehicle for the acceleration operation is performed only during straight running. Similarly, it is desired that the deceleration preparation control for raising the reaction speed of the vehicle for the deceleration operation is performed only during straight running.

<Posture Correspondence Processing Unit>

Based on the driver's posture detected by the posture determination unit 21*a*, the posture correspondence processing unit 21*b* detects the acceleration intention or the deceleration intention of the driver. In general, when in the case of acceleration, the driver presumes that an acceleration load is imposed on his body, and often puts himself into a forward-inclined posture against the load. The posture change becomes larger as the extent of the acceleration increases.

As described above, the acceleration intention of the driver can be detected based on the change of his posture into the forward-inclined posture. In the present embodiment, when the posture of the driver changes from the basic posture or the backward-inclined posture to the forward-inclined posture, the posture correspondence processing unit 21*b* detects the acceleration intention of the driver and then determines execution of the acceleration preparation control.

When the posture of the driver changes from the forward-inclined posture to the basic posture or the backward-inclined posture, the acceleration preparation control ends. In the case where within a predetermined time after the determination on the execution of the acceleration preparation control has been established due to the forward-inclined posture of the driver, the driver does not open the accelerator 8 so as to start the acceleration operation, it is determined that the driver has no acceleration intention, and then the acceleration preparation control ends.

In general, when in the case of deceleration, the driver presumes that a deceleration load is imposed on his body, and often raises his posture so as to put himself into a backward-inclined posture against the load. The posture change becomes larger as the extent of the deceleration increases.

As described above, the deceleration intention of the driver can be detected based on the change of his posture into the backward-inclined posture. That is to say, in the present embodiment, when the posture of the driver changes from the basic posture or the forward-inclined posture to the backward-inclined posture, the posture correspondence processing unit 21*b* detects the deceleration intention of the driver and then determines execution of the deceleration preparation control.

When the posture of the driver changes from the backward-inclined posture to the basic posture or the forward-inclined posture, the deceleration preparation control ends. In addition, in the case where within a predetermined time after the determination on the execution of the deceleration preparation control has been established due to the backward-inclined posture of the driver, the driver starts none of closing the accelerator 8, applying the front wheel brake 9, and applying the rear wheel brake 10, it is determined that the driver has no deceleration intention, and then the deceleration preparation control ends.

The condition utilized for the determination on the acceleration intention of the driver may not be limited to a change in the posture of the driver. For example, it may be allowed that a case where a vehicle ahead of the own vehicle is passed is presumed and then the determination is performed by combining the direction of the driver's face, blinker operation, and the vehicle speed. It may be allowed that a gyroscopic sensor is mounted in a helmet to be worn by the driver, that the roll angle, the pitch angle, the yaw angle, and the like of the head are detected, and that based on the face direction of the driver, determined from the detected angles, blinker operation, and the vehicle speed, it is ascertained whether or not the driver has acceleration intention.

In addition, it may be allowed that information from another sensor in the sensor group 30 is utilized for the determination on the acceleration intention. For example, in the case where after the acceleration intention is determined, the posture of the driver changes to another riding posture, such as braking operation and clutch operation, in which execution of the acceleration preparation control may make the driving unstable, it may be allowed that the acceleration preparation control is ended.

Similarly, it may be allowed that information from another sensor in the sensor group 30 is utilized for the determination on the deceleration intention. For example, in the case where after the deceleration intention is determined, the posture of the driver changes to another riding posture, such as accelerating operation and clutch operation, in which execution of the deceleration preparation control may make the driving unstable, it may be allowed that the deceleration preparation control is ended.

<Driving-Assistance Processing Unit>

A driving-assistance processing unit 23 performs the acceleration preparation control and the deceleration preparation control, based on the determination by the posture correspondence processing unit 21*b*. Specifically, the driving-assistance processing unit 23 transfers control commands to the ignition timing control apparatus 24, the electronically-controlled throttle control apparatus 25, the fuel-injection control apparatus 26, the fuel pump control apparatus 27, the transmission control apparatus 28, and the like.

<Acceleration Preparation Control>

The driving-assistance processing unit 23 performs the acceleration preparation control in order to raise the reaction speed of the vehicle 3 at a time of the acceleration operation by a driver so as to improve the driving feeling. By means of the control command, the driving-assistance processing unit 23 makes the electronically-controlled throttle control apparatus 25 control the air amount adjustment valve of an electronically-controlled throttle (unrepresented) so that the intake air amount increases. There exists a delay time between a time point when the throttle valve is opened and a time point when the amount of air to be sucked by the internal combustion engine 4 increases and hence the filling efficiency of the combustion chamber rises. Accordingly, preliminary opening the throttle valve makes it possible to raise the reaction speed of the internal combustion engine 4 for the acceleration operation at a time when the driver performs the acceleration operation after the preliminary opening.

When only the intake air amount is increased without increasing the fuel supply amount for the internal combustion engine 4, the heat quantity does not largely change and hence the output of the internal combustion engine 4 does not largely change, either. When the amount of air to be sucked by the combustion chamber is preliminarily increased, the fuel can rapidly be increased after the acceleration operation by the driver. In contrast to increasing the air amount, increasing the fuel amount makes it possible to perform short-delay-time control by executing intake-port injection or inner-cylinder injection through the fuel injection valve. Accordingly, the output of the internal combustion engine 4 can rapidly be raised.

In this situation, it may be allowed that as the acceleration preparation control, not only is a command for making the electronically-controlled throttle control apparatus 25 increase the intake air amount transferred, but also a command for making the ignition timing control apparatus 24 delay the ignition timing is transferred. When in the case where the air amount is increased, only the intake air amount is increased without increasing the fuel supply amount for the internal combustion engine 4, the air-fuel ratio of a fuel-air mixture to be introduced into the combustion chamber becomes excessively large (the fuel becomes excessively lean) and hence combustion may become unstable. Accordingly, the heat quantity to be generated in the combustion chamber is increased without largely changing the air-fuel ratio of the fuel-air mixture. Concurrently, the ignition timing is delayed so as to lower the output torque. By concurrently performing these control items, control that, as a whole, neither increases nor decreases the output of the internal combustion engine can be performed.

This method makes it possible that when acceleration operation is performed by a driver, the output of the internal combustion engine can instantaneously be increased by advancing the ignition timing to a normal ignition timing. As a result, acceleration control with an extremely short delay time can be performed.

Moreover, it may be allowed that as the acceleration preparation control, not only is a command for making the electronically-controlled throttle control apparatus 25 increase the intake air amount transferred, but also the fuel-injection control apparatus 26 adjusts the fuel injection amount of the fuel injection valve, in order to prepare for the acceleration operation by the driver. By performing control for increasing the air-fuel ratio of the fuel-air mixture (the fuel is made lean) within an extent that the combustion state does not become unstable, the acceleration preparation control can be performed, while increasing the intake air amount but without largely changing the output of the internal combustion engine 4.

When after that, the driver performs the acceleration operation, the torque is enlarged by rapidly increasing the fuel supply amount; thus, the reaction speed of the internal combustion engine 4 for the acceleration operation can be raised. This method makes it possible that the acceleration preparation control can be performed without requiring any command to the ignition timing control apparatus 24.

Moreover, in the case where the fuel pump is controlled in accordance with the fuel injection amount, it may be allowed that the flow rate of the fuel pump is increased by issuing a command to the fuel pump control apparatus 27, in order to prepare for the acceleration operation by the driver. Increasing the fuel pressure makes it possible to expand the dynamic range of the fuel supply amount through the fuel-injection-valve control by the fuel-injection control apparatus 26. As a result, the reaction speed of the internal combustion engine 4 can be raised by rapidly increasing the fuel supply amount at a time of the acceleration operation.

Moreover, it may be allowed that in order to raise the responsiveness of the vehicle 3, a command is issued to the transmission control apparatus 28 so as to change the transmission ratio of the transmission 5. For example, it may be allowed that as the acceleration preparation control, the gear stage of the transmission 5 is lowered (the transmission ratio is raised through downshifting). Preparation for the acceleration operation by the driver through downshifting of the gear stage of the transmission 5 can contribute to enhancement of the reaction speed of the vehicle 3 at a time of acceleration operation.

In addition, it may be allowed that without waiting for the start of the acceleration operation by the driver, a control command for increasing the torque of the internal combustion engine is issued in the acceleration preparation control so as to accelerate the vehicle 3. In the case where at a time when after the acceleration control, the output of the internal combustion engine 4 actually increases through a delay time, the driver performs acceleration operation, the reaction speed of the vehicle at a time of the acceleration operation can be raised. In the case where at a time when the output of the internal combustion engine 4 actually increases, the driver does not perform acceleration operation, it is only necessary to perform the control so as to prevent the driver from having the feeling of discomfort, by delaying the ignition timing or by performing braking operation so as to suppress the torque from excessively increasing.

When the acceleration preparation control has been completed, the commands that have been transferred to the ignition timing control apparatus 24, the electronically-controlled throttle control apparatus 25, the fuel-injection control apparatus 26, the fuel pump control apparatus 27, and the transmission control apparatus 28 are made ineffective and hence the normal control state is restored. Even in this case, the control should be performed in such a way that the output of the internal combustion engine 4 does not suddenly change.

<Deceleration Preparation Control>

Next, the outputs of the respective control units at a time when a deceleration determination has been established will be explained. The driving-assistance processing unit 23 raises the reaction speed of the vehicle 3 at a time of the acceleration operation by a driver so as to improve the driving feeling. The driving-assistance processing unit 23 performs the deceleration preparation control, based on the determination by the posture correspondence processing unit 21b. The driving-assistance processing unit 23 issue a command for making the electronically-controlled throttle control apparatus 25 reduce the intake air amount. There exists a delay time between a time point when the throttle valve is closed and a time point when the amount of air to be sucked by the internal combustion engine 4 decreases and hence the filling efficiency of the combustion chamber falls. Accordingly, preliminary closing the throttle valve makes it possible to raise the reaction speed of the internal combustion engine 4 for the deceleration operation at a time when the driver performs the deceleration operation after the preliminary closing.

In this situation, when a command is issued to the electronically-controlled throttle control apparatus 25 for reducing only the intake air amount and the fuel-injection control apparatus 26 keeps the fuel injection amount to be supplied from the fuel injection valve from changing, the air-fuel ratio decreases (the fuel becomes rich) although the intake air amount decreases, and hence the torque for the same air amount rises. Accordingly, the decrease in the output of the internal combustion engine, caused by a decrease in the air amount, is reduced.

When the amount of air to be sucked by the combustion chamber is preliminarily decreased, the fuel can rapidly be decreased after the deceleration operation by the driver. In contrast to decreasing the air amount, decreasing the fuel amount makes it possible to perform short-delay-time control by executing intake-port injection or inner-cylinder injection through the fuel injection valve. Accordingly, the output of the internal combustion engine 4 can rapidly be decreased.

In this situation, it may be allowed that as the deceleration preparation control, not only is a command for making the electronically-controlled throttle control apparatus 25 decrease the intake air amount transferred, but also a command for making the ignition timing control apparatus 24 advance the ignition timing is transferred. When in the case where the air amount is decreased, only the intake air amount is decreased without decreasing the fuel supply amount for the internal combustion engine 4, the air-fuel ratio of a fuel-air mixture to be introduced into the combustion chamber becomes excessively small (the fuel becomes excessively rich) and hence combustion may become unstable. Accordingly, the heat quantity to be generated in the combustion chamber is decreased without largely changing the air-fuel ratio of the fuel-air mixture. Concurrently, the ignition timing is advanced so as to raise the output torque. By concurrently performing these control items, control that, as a whole, neither increases nor decreases the output of the internal combustion engine can be performed.

This method makes it possible that when deceleration operation is performed by a driver, the output of the internal combustion engine can instantaneously be decreased by delaying the ignition timing to the normal ignition timing. As a result, deceleration control with an extremely short delay time can be performed.

Moreover, it may be allowed that as the deceleration preparation control, not only is a command for making the electronically-controlled throttle control apparatus 25 decrease the intake air amount transferred, but also the fuel-injection control apparatus 26 adjusts the fuel injection amount of the fuel injection valve, in order to prepare for the deceleration operation by the driver. By performing control for decreasing the air-fuel ratio of the fuel-air mixture (the fuel is made rich) within an extent that the combustion state does not become unstable, the deceleration preparation control can be performed, while decreasing the intake air amount but without largely changing the output of the internal combustion engine. There is utilized a characteristic that by decreasing the air-fuel ratio of the fuel-air mixture (the fuel is made rich), the torque for the same air amount increases.

When after that, the driver performs the deceleration operation, the torque is reduced by rapidly decreasing the fuel supply amount; thus, the reaction speed of the vehicle for the deceleration operation can be raised. This method makes it possible that the deceleration preparation control can be performed without requiring any command to the ignition timing control apparatus 24.

In this situation, the driving-assistance processing unit 23 may prepare for deceleration, by issuing a command to the transmission control apparatus 28 for lowering the gear stage of the transmission 5 (raising the transmission ratio). The reason for that is because by closing the throttle after lowering the gear stage, the effect of the engine brake can be raised.

In addition, it may be allowed that without waiting for the start of the deceleration operation by the driver, a control command for decreasing the torque of the internal combustion engine is issued in the deceleration preparation control so as to decelerate the vehicle 3. In the case where at a time when after the deceleration control, the output of the internal combustion engine 4 actually decreases through a delay time, the driver performs deceleration operation, the reaction speed of the vehicle for the deceleration operation can be raised. In the case where at a time when the output of the internal combustion engine 4 actually decreases, the driver does not perform deceleration operation, it is only necessary to perform the control so as to prevent the driver from having the feeling of discomfort, by advancing the ignition timing so as to suppress the torque from excessively decreasing.

When the deceleration preparation control has been completed, the commands that have been transferred to the ignition timing control apparatus 24, the electronically-controlled throttle control apparatus 25, the fuel-injection control apparatus 26, the fuel pump control apparatus 27, and the transmission control apparatus 28 are made ineffective and hence the normal control state is restored. Even in this case, the control should be performed in such a way that the output of the internal combustion engine 4 does not suddenly change.

Other Embodiments of Head-Position Detection Unit

Figure 6:
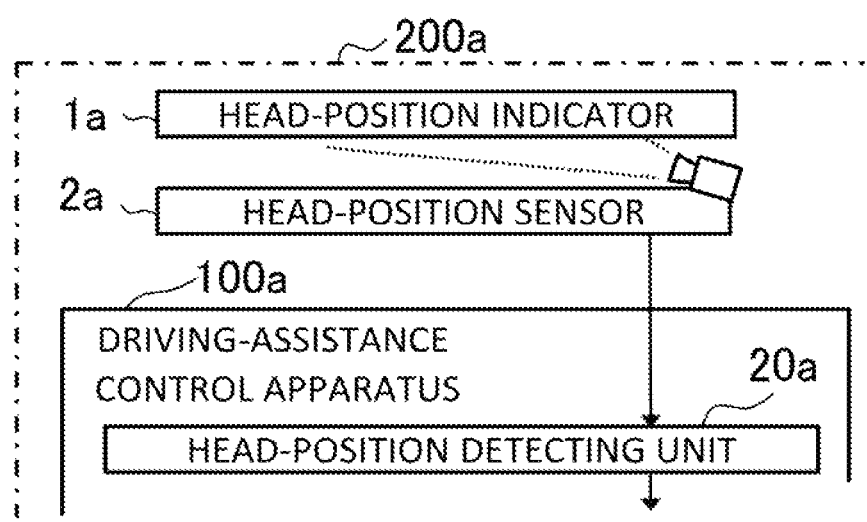
FIG. 6 is a second configuration diagram of the driving assistance apparatus according to Embodiment 1.

FIG. 6 is a second configuration diagram of the driving assistance apparatus according to Embodiment 1. In a driving assistance apparatus 200a, the method of detection by a head-position detection unit 20a is different from that represented in FIG. 1. FIG. 6 represents only different parts thereof.

FIG. 6 represents the case where as a head-position sensor 2a, a camera is utilized. A head-position indicator 1a is photographed by the camera; the position thereof can be detected by use of the photographed image. Two or more cameras may be utilized. The head-position indicator 1a can be replaced by a position marker provided on a helmet. When part of a helmet, the face of a driver, or part of the face is recognized through image recognition, head-position detection can be performed without wearing a dedicated helmet.

In a driving-assistance control apparatus 100a, the head-position detection unit 20a is different from the head-position detection unit 20 of the driving-assistance control apparatus 100 represented in FIG. 5. The head-position detection unit 20a has a function of detecting the head position of a driver from image information obtained by the head-position sensor 2a, which is a camera.

Figure 7:
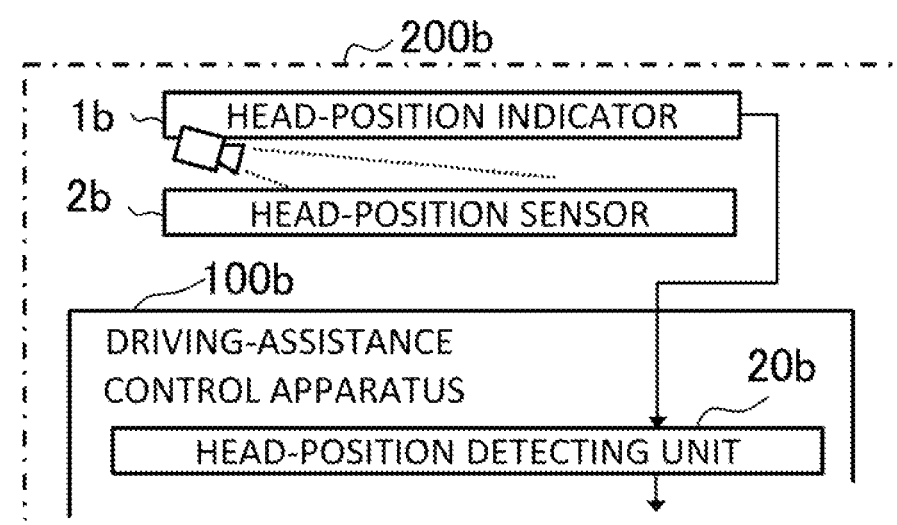
FIG. 7 is a third configuration diagram of the driving assistance apparatus according to Embodiment 1.

FIG. 7 is a third configuration diagram of the driving assistance apparatus according to Embodiment 1. In a driving assistance apparatus 200b, the method of detection by a head-position detection unit 20b is different from that represented in each of FIGS. 5 and 6. FIG. 7 represents only different parts thereof.

FIG. 7 represents the case where as a head-position indicator 1b, a camera fixed to a helmet is utilized. The head-position indicator 1b, which is a camera, photographs a head-position sensor 2b, which is a display marker; then, the relative position between the head-position indicator 1b and the head-position sensor 2b is detected from image information. The image information photographed by the head-position indicator 1b is transmitted to the head-position detection unit 20b of a driving-assistance control apparatus 100b through a wireless signal.

As the head-position sensor 2b, a marker having a high performance of being recognized as an image may be utilized; however, it may also be allowed that the position of the head-position sensor 2b is detected by recognizing, as the head-position sensor 2b, a characteristic part such as the steering handle 11 of the vehicle 3 or a front-wheel mud cover. It may be allowed that by use of a camera image, the roll angle θv is detected from a road and the posture of the vehicle 3 and that it is determined whether the vehicle is running straight or turning, based on the traveling speed and the traveling direction of a road surface. When as the reference position, the central position of the steering handle 11 is utilized, the head-vehicle distance Pd and the left-and-right posture moving angle Pθ can be obtained from the reference position and the position of the head-position indicator 1b, even when the head-position sensor 2b is not situated at the central position of the steering handle 11.

Example of Riding Posture

Figure 8:
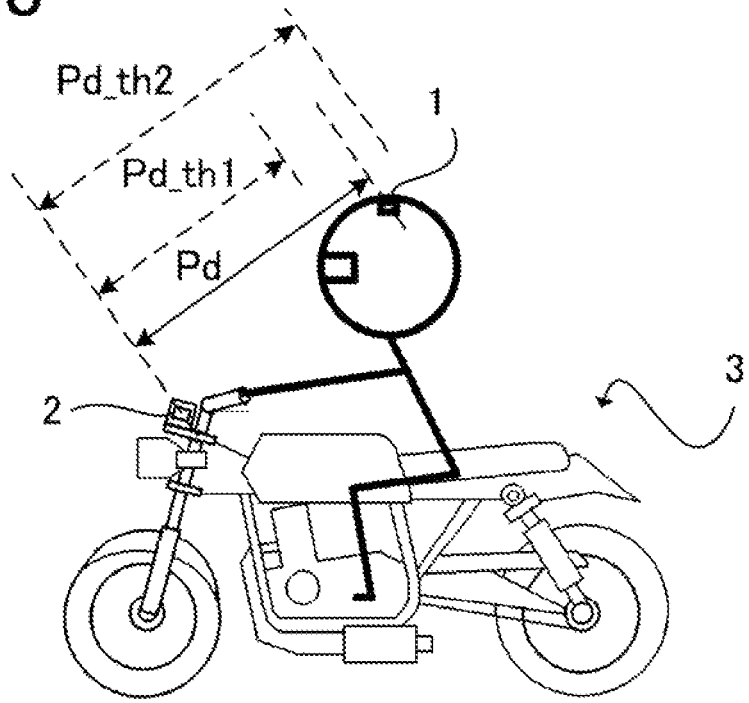
FIG. 8 is a left-side view for explaining a driver's basic posture according to Embodiment 1.

FIG. 8 is a left-side view for explaining a driver's basic posture according to Embodiment 1. FIG. 8 illustrates the vehicle 3 in a state where the driver has neither intention of acceleration nor intention of deceleration and takes a basic posture. The head-vehicle distance Pd is the same as or larger than the forward-inclination determination value Pd_th1 and is the same as or smaller than the backward-inclination determination value Pd_th2.

Figure 9:
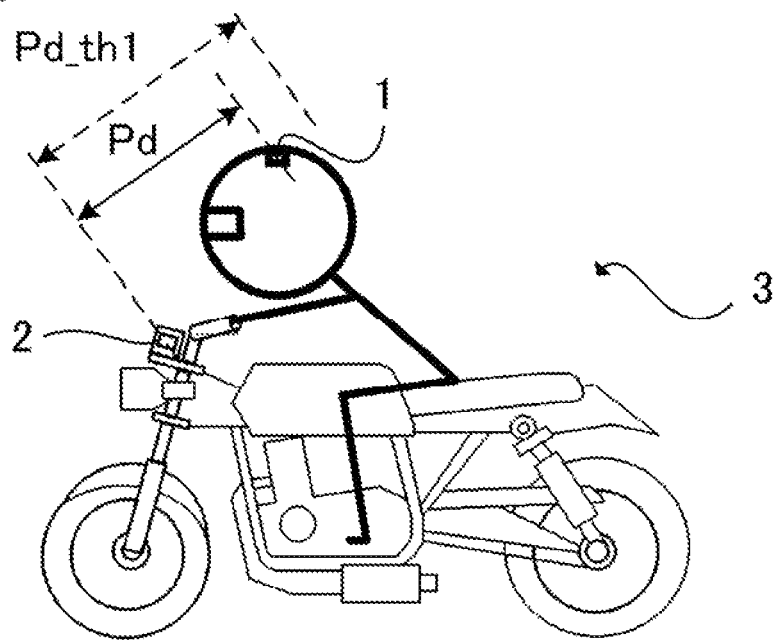
FIG. 9 is a left-side view for explaining a driver's forward-inclined posture according to Embodiment 1.

FIG. 9 is a left-side view of the vehicle 3 in a state the driver is accelerating the vehicle and has taken a forward-inclined posture. In the forward-inclined posture, the head of the driver is situated forward in comparison with the basic posture. The head-vehicle distance Pd is smaller than the forward-inclination determination value Pd_th1.

Figure 10:
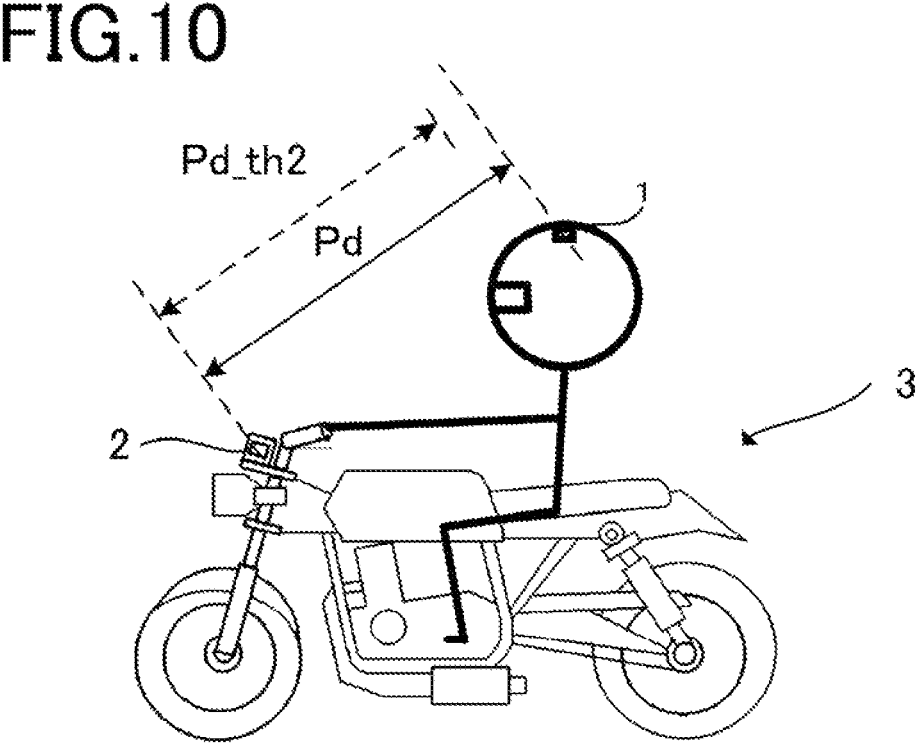
FIG. 10 is a left-side view for explaining a driver's backward-inclined posture according to Embodiment 1.

FIG. 10 is a left-side view illustrating the vehicle 3 in a state where the driver has taken a backward-inclined posture that suggests a state where the driver is decelerating the vehicle or has started the vehicle. In the backward-inclined posture, the head of the driver is situated backward in comparison with the basic posture. The head-vehicle distance Pd is larger than the backward-inclination determination value Pd_th2.

As described above, each of the basic posture, the forward-inclined posture, and the backward-inclined posture can be determined based on the head position of a driver. That is to say, in the case where as illustrated in FIG. 9, the head-vehicle distance Pd is smaller than the forward-inclination determination value Pd_th1, the posture determination unit 21a determines that the driver is in the forward-inclined posture. In the case where as illustrated in FIG. 8, the head-vehicle distance Pd is the same as or larger than the forward-inclination determination value Pd_th1 and is the same as or smaller than the backward-inclination determination value Pd_th2, the posture determination unit 21a determines that the driver is in the basic posture. In the case where as illustrated in FIG. 10, the head-vehicle distance Pd is larger than the backward-inclination determination value Pd_th2, the posture determination unit 21a determines that the driver is in the backward-inclined posture. According to the survey by the applicant of the present application, for example, the forward-inclination determination value Pd_th1 and the backward-inclination determination value Pd_th2 can be set to 40 cm and 70 cm, respectively.

<Flowchart of Processing for Each of Driving-Posture Determination and Straight-Running Determination>

Figure 11:
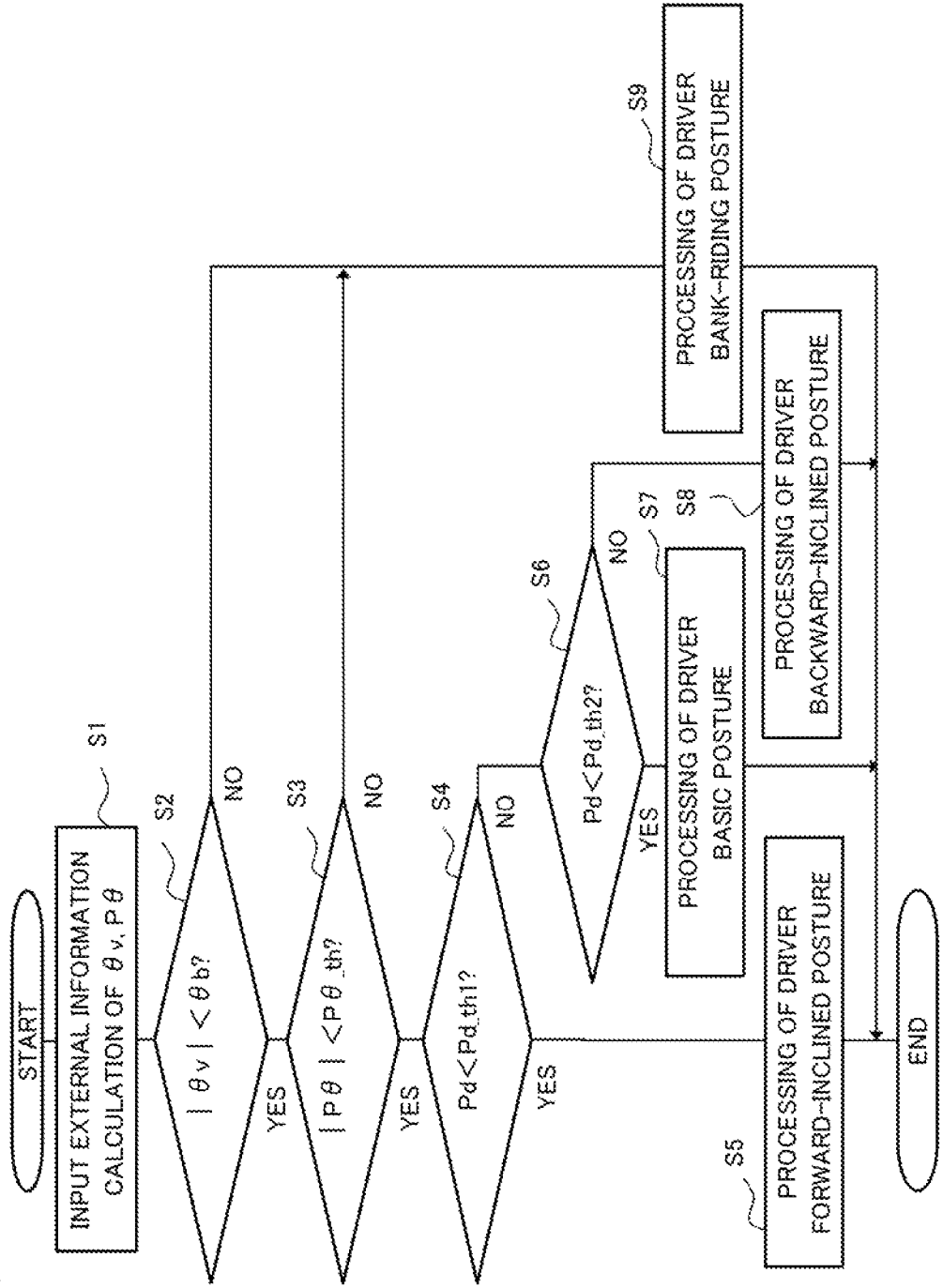
FIG. 11 is a flowchart representing processing for each of a driving-posture determination and a straight-running determination in the driving-assistance control apparatus according to Embodiment 1.

FIG. 11 is a flowchart representing processing for each of a driving-posture determination and a straight-running determination in the driving-assistance control apparatus 100 according to Embodiment 1. The processing represented in FIG. 11 is performed every predetermined time (for example, every 1 ms). Each of the processing items represented in FIG. 11 may be performed not every predetermined time but each time a predetermined event occurs, for example, each time a signal of the vehicle speed sensor is inputted. Hereinafter, performance of the processing items represented in the flowchart in FIG. 11 by the driving-assistance control apparatus 100 will be explained.

In the step S1 after the start of the processing, external information is inputted so that the roll angle θv and the left-and-right posture moving angle Pθ are calculated. The driving-assistance control apparatus 100 receives the external information items from the head-position sensor 2 and the sensor group 30. The head-position detection unit 20 and the posture determination unit 21a calculates the left-and-right posture moving angle Pθ, based on the head position of a driver. Then, based on the output of the inclination angle sensor 14, the straight-running determination unit 22 calculates the roll angle θv (bank angle) indicating the rotation, around the X axis, of the vehicle 3.

In the steps S2 and S3, the straight-running determination unit 22 determines whether or not the vehicle 3 is running straight. In the step S2, in order to determine whether or not the vehicle 3 is running straight, it is determined whether or not the absolute value of the roll angle θv (bank angle) is smaller than the determination roll angle θb. In the case where the roll angle θv of the vehicle is smaller than the determination roll angle θb, an affirmative determination is made and then the step S2 is followed by the step S3. In the case where a negative determination is made in the step S2, it is determined that the vehicle 3 is banking at an angle the same as or more than the determination roll angle θb; then, the step S2 is followed by the step S9.

In the step S3, it is determined whether or not the posture of the driver is moving in a vehicle-width direction. It is determined whether or not the left-and-right posture moving angle Pθ of the driver with respect to the center line A of the vehicle is smaller than the determination left-and-right posture moving angle Pθ_th. In the case where an affirmative determination is made in the step S3, it is determined that the vehicle 3 is running straight; then, the step S3 is followed by the step S4. In the case where a negative determination is made in the step S3, it is determined that the posture of the driver has moved at an angle the same as or more than the determination left-and-right posture moving angle Pθ_th in the left-and-right direction; then, the step S3 is followed by the step S9.

In the steps S4 and S6, the posture determination unit 21a determines the anteroposterior-direction posture of the driver. In the steps S5, S7, S8, and S9, the posture correspondence processing unit 21b operates a flag and a timer in accordance with respective postures.

In the step S4, it is determined whether or not the head-vehicle distance Pd is smaller than the forward-inclination determination value Pd_th1. In the case where an affirmative determination is made in the step S4, the step S4 is followed by the step S5, where driver forward-inclined posture processing is performed; then, the processing is ended.

In the case where a negative determination is made in the step S4, the step S4 is followed by the step S6, where it is determined whether or not the head-vehicle distance Pd is smaller than the backward-inclination determination value Pd_th2. In the case where an affirmative determination is made in the step S6, the step S6 is followed by the step S7, where driver basic posture processing is performed; then, the processing is ended.

In the case where a negative determination is made in the step S6, the step S6 is followed by the step S8, where driver backward-inclined posture processing is performed; then, the processing is ended.

In the step S9, bank-riding posture processing is performed; then, the processing is ended. The contents of the respective processing items will be explained in detail by use of FIGS. 12, 13, 14, and 15.

<Flowchart of Driver Forward-Inclined Posture Processing>

Figure 12:
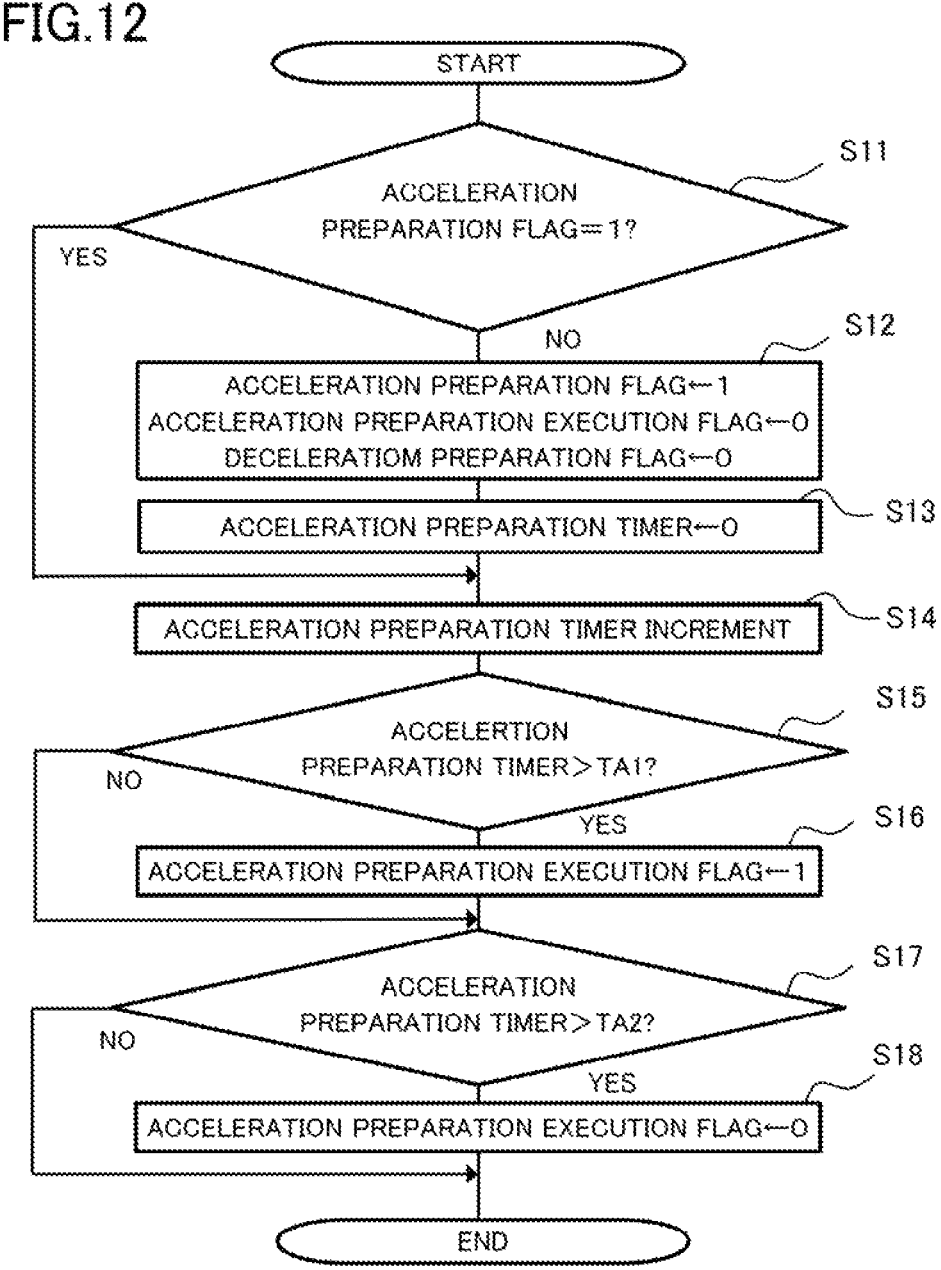
FIG. 12 is a first flowchart representing posture processing in the driving-assistance control apparatus according to Embodiment 1.

FIG. 12 is a first flowchart representing posture processing in the driving-assistance control apparatus 100 according to Embodiment 1. FIG. 12 explains the contents of the driver forward-inclined posture processing in the step S5 of the flowchart represented in FIG. 11.

In the step S11 after the start of the processing, it is determined whether or not an acceleration preparation flag has been set. The acceleration preparation flag is to indicate that acceleration preparation conditions are satisfied and the timer has started time measurement. In the case where the acceleration preparation flag has been set (affirmative determination), the step S11 is followed by the step S14. In the case where the acceleration preparation flag has not been set (negative determination), the step S11 is followed by the step S12.

In the step S12, because the present timing is immediately after the acceleration preparation conditions have been satisfied, initial setting of the flag is executed. The acceleration preparation flag is set, an acceleration preparation execution flag is cleared, and a deceleration preparation flag is cleared. The acceleration preparation execution flag indicates an instruction for executing acceleration preparation control. The deceleration preparation flag indicates that deceleration preparation conditions are satisfied and the timer has started time measurement; the reason why the deceleration preparation flag is cleared at this moment is that when the deceleration preparation conditions are satisfied next time, the initial setting is executed. After the step S12, an acceleration preparation timer is cleared in the step S13. The acceleration preparation timer measures a duration time after the acceleration preparation conditions are satisfied. After that, the step S13 is followed by the step S14.

In the step S14, the acceleration preparation timer is incremented. In the case where the flowchart in FIG. 11 is performed every 1 ms, the acceleration preparation timer is incremented by one count every 1 ms. After that, the step S14 is followed by the step S15, where it is determined whether or not the value of the acceleration preparation timer has exceeded an acceleration-preparation control permission time TA1. The value of the acceleration-preparation control permission time TA1 is, for example, 50 ms. In the case where the value of the acceleration preparation timer has exceeded the acceleration-preparation control permission time TA1 (affirmative determination), it can be ascertained that the forward-inclined posture of the driver is not instantaneous but continuous and hence the acceleration intention is certain. In that case, the step S15 is followed by the step S16. In the step S16, the acceleration preparation execution flag is set; then, the step S16 is followed by the step S17.

In the case where it is determined in the step S15 that the value of the acceleration preparation timer is the same as or smaller than the acceleration-preparation control permission time TA1 (negative determination), the determination on the acceleration intention of the driver is put on hold because an erroneous determination may be made; then, the step S15 is followed by the step S17.

In the step S17, it is determined whether or not the value of the acceleration preparation timer has exceeded an acceleration-preparation control ending time TA2. The value of the acceleration-preparation control ending time TA2 is, for example, 1000 ms. In the case where the value of the acceleration preparation timer has not exceeded the acceleration-preparation control ending time TA2 (negative determination), the processing is ended.

In the case where in the step S17, the value of the acceleration preparation timer has exceeded the acceleration-preparation control ending time TA2 (affirmative determination), the step S17 is followed by the step S18. In this case, because an excessively long time has elapsed after the acceleration intention of the driver had been detected, it should be determined that the driver did not have the acceleration intention; thus, the acceleration preparation execution flag is cleared. As a result, the acceleration preparation control can be completed. Then, the foregoing processing is ended.

<Flowchart of Driver Basic Posture Processing>

Figure 13:
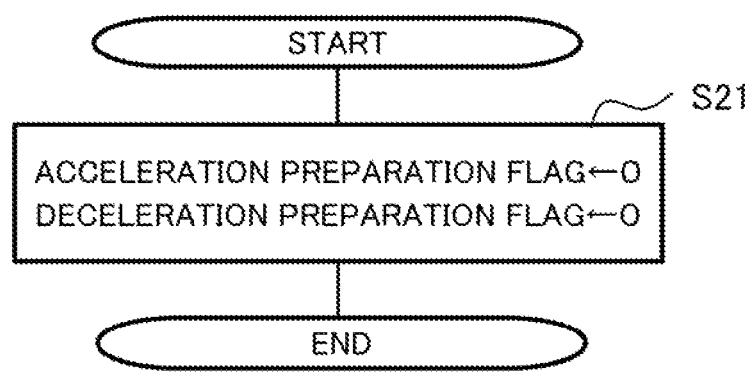
FIG. 13 is a second flowchart representing the posture processing in the driving-assistance control apparatus according to Embodiment 1.

FIG. 13 is a second flowchart representing posture processing in the driving-assistance control apparatus 100 according to Embodiment 1. FIG. 13 explains the contents of the driver basic posture processing in the step S7 of the flowchart represented in FIG. 11.

In the step S21 after the start of the processing, the acceleration preparation flag and the deceleration preparation flag are cleared. The reason why the foregoing flags are cleared here is that when the acceleration preparation conditions or the deceleration preparation condition are satisfied, the initial setting is performed. Then, the foregoing processing is ended.

<Flowchart of Driver Backward-Inclined Posture Processing>

Figure 14:
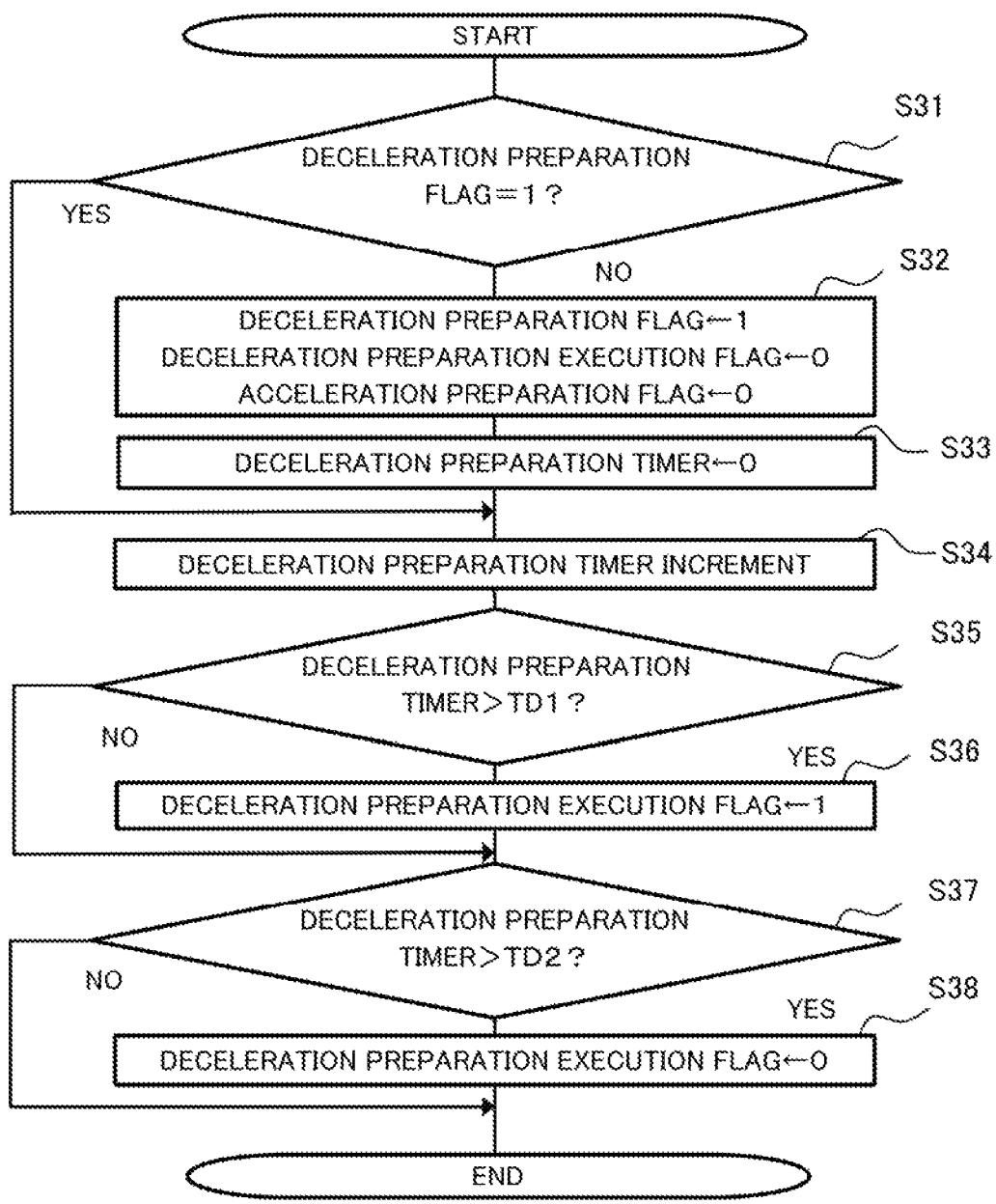
FIG. 14 is a third flowchart representing the posture processing in the driving-assistance control apparatus according to Embodiment 1.

FIG. 14 is a third flowchart representing posture processing in the driving-assistance control apparatus 100 according to Embodiment 1. FIG. 14 explains the contents of the driver backward-inclined posture processing in the step S8 of the flowchart represented in FIG. 11.

In the step S31 after the start of the processing, it is determined whether or not the deceleration preparation flag has been set. In the case where the deceleration preparation flag has been set (affirmative determination), the step S31 is followed by the step S34. In the case where the deceleration preparation flag has not been set (negative determination), the step S31 is followed by the step S32.

In the step S32, because the present timing is immediately after the deceleration preparation conditions have been satisfied, the initial setting of the flag is executed. The acceleration preparation flag is set, a deceleration preparation execution flag is cleared, and the deceleration preparation flag is cleared. The reason why the acceleration preparation flag is cleared here is that when the acceleration preparation conditions are satisfied, the initial setting is performed. After the step S32, a deceleration preparation timer is cleared in the step S33. The deceleration preparation timer measures a duration time after the deceleration preparation conditions are satisfied. After that, the step S33 is followed by the step S34.

In the step S34, the deceleration preparation timer is incremented. In the case where the flowchart in FIG. 11 is performed every 1 ms, the deceleration preparation timer is incremented by one count every 1 ms. After that, the step S34 is followed by the step S35, where it is determined whether or not the value of the deceleration preparation timer has exceeded a deceleration-preparation control permission time TD1. The value of the deceleration-preparation control permission time TD1 is, for example, 50 ms. In the case where the value of the deceleration preparation timer has exceeded the deceleration-preparation control permission time TD1 (affirmative determination), it can be ascertained that the backward-inclined posture of the driver is not instantaneous but continuous and hence the deceleration intention is certain. In that case, the step S35 is followed by the step S36. In the step S36, the deceleration preparation execution flag is set; then, the step S36 is followed by the step S37.

In the case where it is determined in the step S35 that the value of the deceleration preparation timer is the same as or smaller than the deceleration-preparation control permission time TD1 (negative determination), the determination on the deceleration intention of the driver is put on hold because an erroneous determination may be made; then, the step S35 is followed by the step S37.

In the step S37, it is determined whether or not the value of the deceleration preparation timer has exceeded a deceleration-preparation control ending time TD2. The value of the deceleration-preparation control ending time TD2 is, for example, 1000 ms. In the case where the value of the deceleration preparation timer has not exceeded the deceleration-preparation control ending time TD2 (negative determination), the processing is ended.

In the case where in the step S37, the value of the deceleration preparation timer has exceeded the deceleration-preparation control ending time TD2 (affirmative determination), the step S37 is followed by the step S38. In this case, because an excessively long time has elapsed after the deceleration intention of the driver had been detected, it should be determined that the driver did not have the deceleration intention; thus, the deceleration preparation execution flag is cleared. As a result, the deceleration preparation control can be completed. Then, the foregoing processing is ended.

<Flowchart of Bank-Riding Posture Processing>

Figure 15:
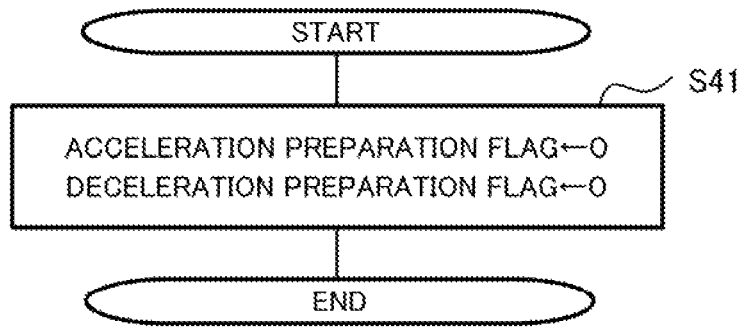
FIG. 15 is a fourth flowchart representing the posture processing in the driving-assistance control apparatus according to Embodiment 1.

FIG. 15 is a fourth flowchart representing posture processing in the driving-assistance control apparatus 100 according to Embodiment 1. FIG. 15 explains the contents of the bank-riding posture processing in the step S9 of the flowchart represented in FIG. 11. The foregoing posture processing is performed in the case where it is determined that the vehicle 3 is not running straight.

In the step S41 after the start of the processing, the acceleration preparation flag and the deceleration preparation flag are cleared. The reason why the foregoing flags are cleared here is that when the acceleration preparation conditions or the deceleration preparation condition are satisfied, the initial setting is performed. Then, the foregoing processing is ended.

<Flowchart of Driving-Assistance Processing>

Figure 16:
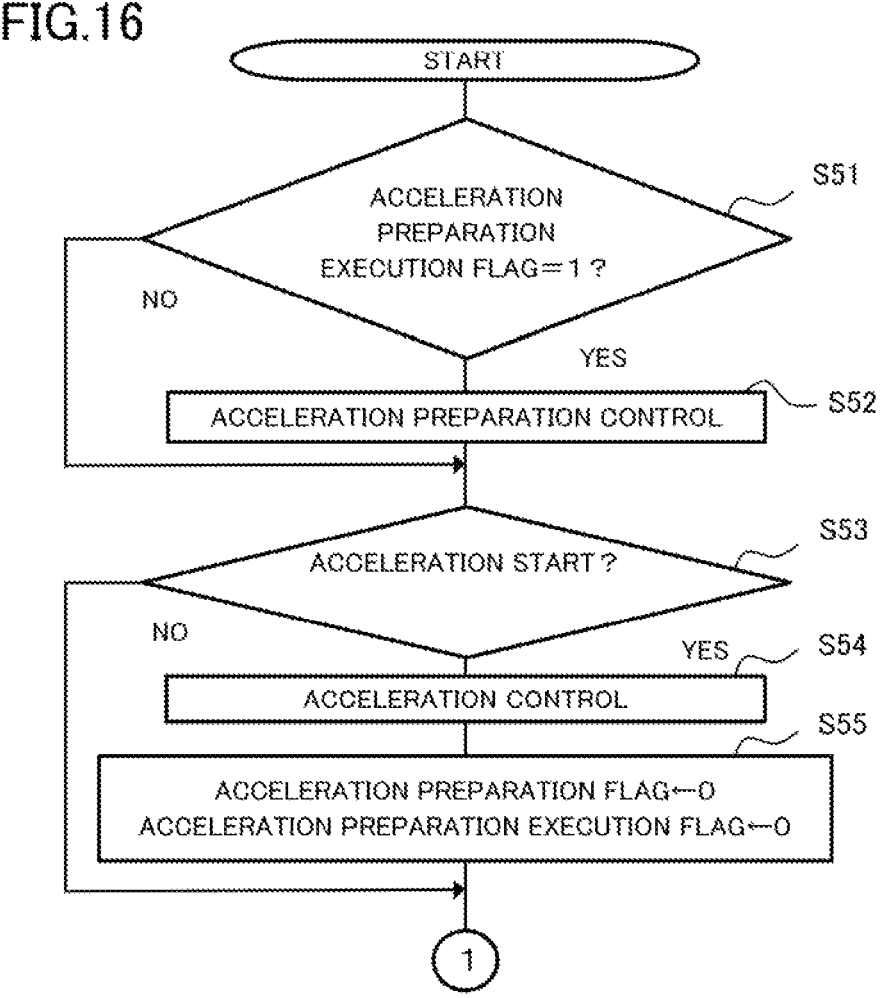
FIG. 16 is a first flowchart representing driving-assistance processing in the driving-assistance control apparatus according to Embodiment 1.
Figure 17:
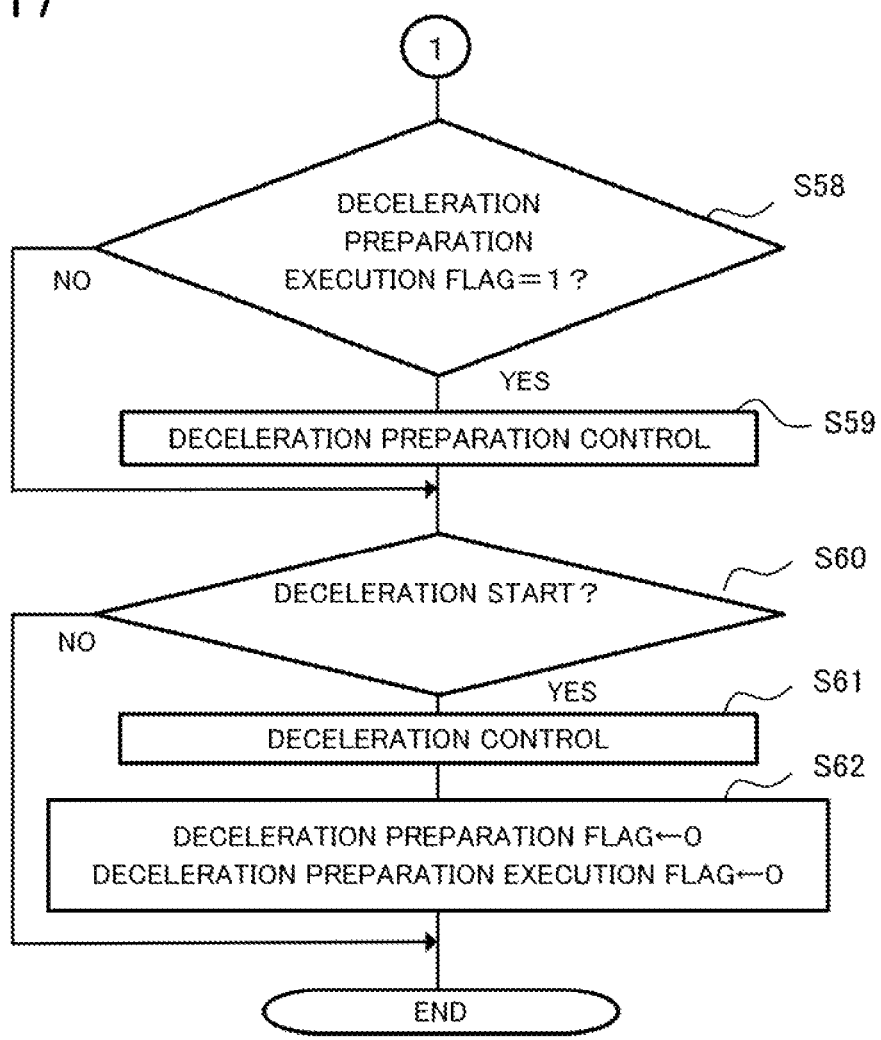
FIG. 17 is a second flowchart representing the driving-assistance processing in the driving-assistance control apparatus according to Embodiment 1.

FIG. 16 is a first flowchart representing driving-assistance processing in the driving-assistance control apparatus 100 according to Embodiment 1. FIG. 17 is a second flowchart representing the driving-assistance processing and represents the rest of the flowchart in FIG. 16. The processing represented in FIG. 16 is performed every predetermined time (for example, every 1 ms). Each of the processing items represented in FIG. 16 may be performed not every predetermined time but each time a predetermined event occurs, for example, each time a signal of the vehicle speed sensor is inputted.

In the step S51 after the start of the processing, it is determined whether or not the acceleration preparation execution flag has been set. In the case where the acceleration preparation execution flag has not been set (negative determination), the step S51 is followed by the step S53. In the case where in the step S51, the acceleration preparation execution flag has been set (affirmative determination), the step S51 is followed by the step S52.

In the step S52, the driving-assistance control apparatus 100 performs the acceleration preparation control. Specifically, in the acceleration preparation control, the driving-assistance control apparatus 100 performs any one of the following operation items or a combination of those operation items:

- transfer of a command for making the electronically-controlled throttle control apparatus 25 increase the intake air amount;
- transfer of a command for making the ignition timing control apparatus 24 delay the ignition timing;
- transfer of a command for making the fuel-injection control apparatus 26 increase the fuel injection amount of the fuel injection valve;
- transfer of a command for making the fuel pump control apparatus 27 increase the flow rate of the fuel pump (unillustrated); and
- transfer of a command for making the transmission control apparatus 28 lower the gear stage of the transmission 5 (the transmission ratio is raised through downshifting). After that, the step S52 is followed by the step S53.

In the step S53, the driving-assistance control apparatus 100 determines whether or not the acceleration has been started. Specifically, the driving-assistance control apparatus 100 determines whether or not the driver has performed accelerating operation of the accelerator. In the case where the acceleration has not been started (negative determination), the step S53 is followed by the step S58. In the case where the acceleration has been started (affirmative determination), the step S53 is followed by the step S54.

In the step S54, the acceleration control is performed. When the accelerator is operated, each of the control apparatuses performs normal control after receiving the input signal from the sensor group 30. The electronically-controlled throttle control apparatus 25 makes the electronically-controlled throttle increase the intake air amount. The fuel-injection control apparatus 26 makes the fuel injection valve increase the fuel injection amount. In accordance with the intake air amount and the rotation speed, the ignition timing control apparatus 24 performs the control at the optimum timing. In this situation, because the preparation has been made through the acceleration preparation control, the output of the internal combustion engine 4 rapidly increases in response to acceleration operation, and because the gear stage of the transmission 5 has been lowered (the transmission ratio has been raised through downshifting), the vehicle can rapidly be accelerated.

After that, in the step S55, the acceleration preparation flag and the acceleration preparation execution flag are cleared. The reason for that is because the acceleration control has been started and hence the acceleration preparation control is ended. Then, the step S55 is followed by the step S58.

In the step S58, it is determined whether or not the deceleration preparation execution flag has been set. In the case where the deceleration preparation execution flag has not been set (negative determination), the step S58 is followed by the step S60. In the case where in the step S58, the deceleration preparation execution flag has been set (affirmative determination), the step S58 is followed by the step S59.

In the step S59, the driving-assistance control apparatus 100 performs the deceleration preparation control. Specifically, in the deceleration preparation control, the driving-assistance control apparatus 100 performs any one of the following operation items or a combination of those operation items:

transfer of a command for making the electronically-controlled throttle control apparatus 25 decrease the intake air amount;

transfer of a command for making the ignition timing control apparatus 24 advance the ignition timing; and transfer a command for making the fuel-injection control apparatus 26 adjust the fuel injection amount of the fuel injection valve so as to reduce the air-fuel ratio of the fuel-air mixture. After that, the step S59 is followed by the step S60.

In the step S60, the driving-assistance control apparatus 100 determines whether or not deceleration has been started. Specifically, the driving-assistance control apparatus 100 determines whether or not the driver has performed any one of the operation of the accelerator for deceleration, the operation of the front wheel brake, and the operation of the rear wheel brake. In the case where the deceleration has not been started (negative determination), the processing is ended. In the case where the deceleration has been started (affirmative determination), the step S60 is followed by the step S61.

In the step S61, the deceleration control is performed. When the operation of the accelerator for deceleration, the operation of the front wheel brake, or the operation of the rear wheel brake is performed, each of the control apparatuses performs normal control in response to the input signal from the sensor group 30. The electronically-controlled throttle control apparatus 25 makes the electronically-controlled throttle decrease the intake air amount. The fuel-injection control apparatus 26 makes the fuel injection valve decrease the fuel injection amount. In accordance with the intake air amount and the rotation speed, the ignition timing control apparatus 24 performs the control at the optimum timing. In this situation, because the preparation has been made through the deceleration preparation control, the output of the internal combustion engine 4 can rapidly be decreased in response to the deceleration operation. In addition, in the case where the gear stage of the transmission 5 has been lowered (the transmission ratio has been raised through downshifting), the engine brake effectively works in accordance with closing control of the throttle; thus, the vehicle can rapidly be decelerated.

After that, in the step S62, the deceleration preparation flag and the deceleration preparation execution flag are cleared. The reason for that is because the deceleration control has been started and hence the deceleration preparation control is ended. Then, the processing is ended.

2. Embodiment 2

Figure 18:
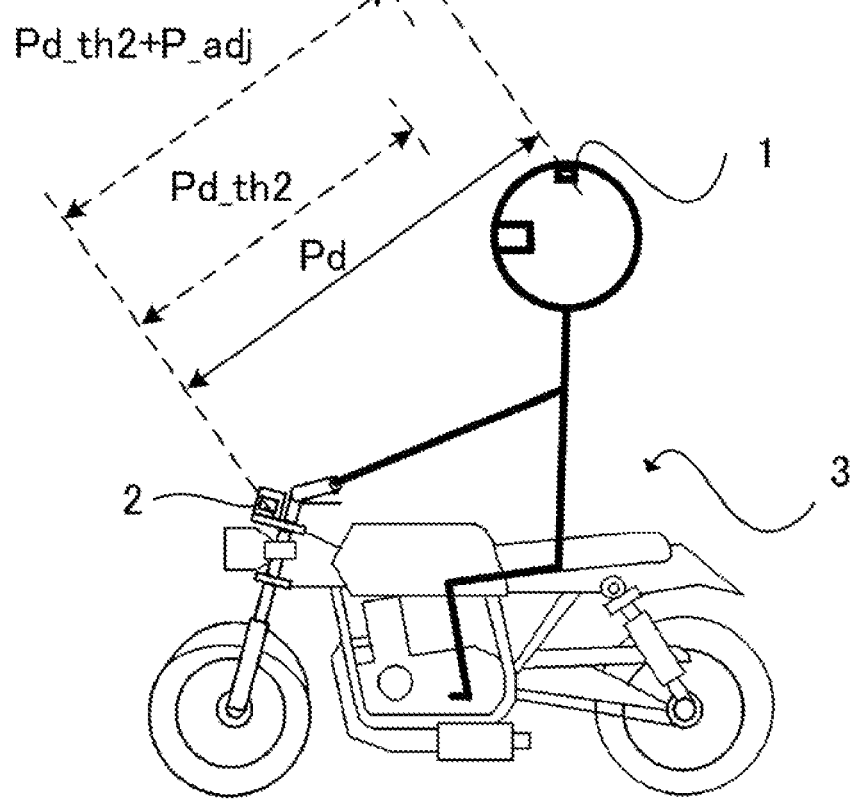
FIG. 18 is a first left-side view for explaining a driver's riding posture according to Embodiment 2.
Figure 19:
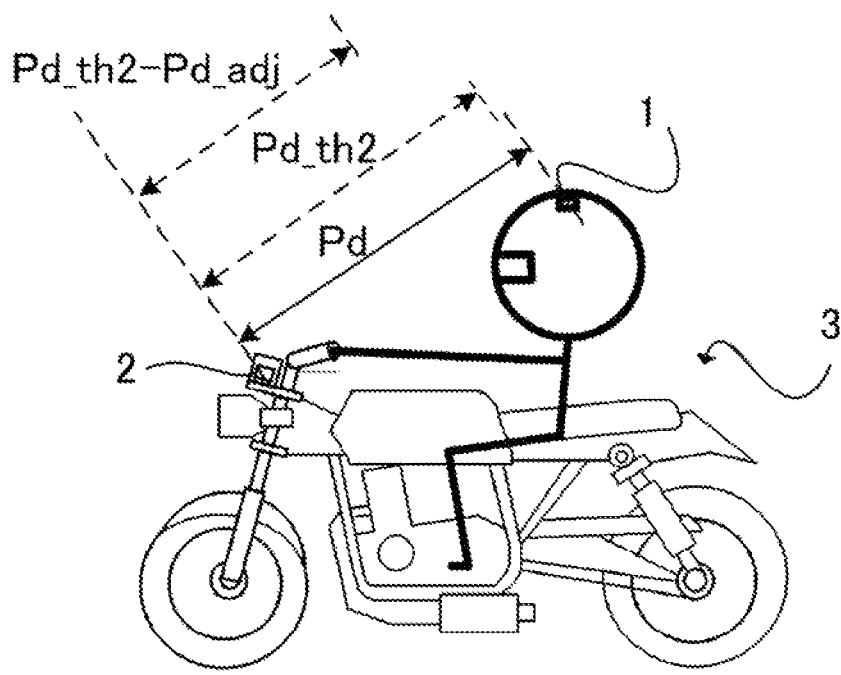
FIG. 19 is a second left-side view for explaining a driver's riding posture according to Embodiment 2.

FIG. 18 is a first left-side view for explaining a driver's riding posture according to Embodiment 2. FIG. 19 is a second left-side view for explaining a driver's riding posture according to Embodiment 2. In a driving-assistance control apparatus 100c according to Embodiment 2, the forward-inclination determination value Pd_th1 and the backward-inclination determination value Pd_th2 can be corrected through external operation or automatic setting (the driving-assistance control apparatus 100c is not illustrated).

The modes of the basic posture, the forward-inclined posture, and the backward-inclined posture in a vehicle of a type, such as a super sport, whose main purpose is sports running differ from those in a vehicle of a type, such as a tourer, whose main purpose is touring. Accordingly, it is required that in accordance with the shape of the vehicle and a presumed posture of the driver, the forward-inclination determination value Pd_th1 and the backward-inclination determination value Pd_th2 are set. In this case, the forward-inclination determination value Pd_th1 and the backward-inclination determination value Pd_th2 can be corrected through adjustment from the outside. As a result, the driving-assistance control apparatus 100c according to Embodiment 2 can be applied to various types of vehicles; additionally, the case where part of the shape of the vehicle 3 is changed due to remodeling can also be dealt with.

Moreover, the forward-inclination determination value Pd_th1 and the backward-inclination determination value Pd_th2 may be corrected by use of personal information on a driver. For example, in the case where as illustrated in FIG. 18, the sitting height of the driver is large in the backward-inclined posture, it may be allowed that a correction value Pd_adj is calculated based on the preliminarily inputted sitting height of the driver and a preliminarily set table and then the forward-inclination determination value Pd_th1 and the backward-inclination determination value Pd_th2 are corrected. Even in the case where as illustrated in FIG. 19, the sitting height of the driver is small, the correction value Pd_adj is similarly calculated based on the preliminarily inputted sitting height of the driver and the preliminarily set table and then the forward-inclination determination value Pd_th1 and the backward-inclination determination value Pd_th2 are corrected, so that the accuracy of the determination on the driver's posture can be raised. The respective correction values Pd_adj may be separately provided for the forward-inclination determination value Pd_th1 and the backward-inclination determination value Pd_th2. Moreover, the respective correction values Pd_adj may be coefficients by which the forward-inclination determination value Pd_th1 and the backward-inclination determination value Pd_th2 are multiplied.

It may be allowed that the sitting height of a driver is calculated by use of a preliminarily inputted height of the driver and a predetermined ratio to the height. Moreover, it may be allowed that the sitting height of a driver is calculated by use of the driver's head position under the condition that the vehicle is stopped and is not inclined. Furthermore, it may be allowed that the immediately previous predetermined-duration average value of the driver's head position or the immediately previous predetermined-duration average value of the head-vehicle distance Pd is obtained and that the forward-inclination determination value Pd_th1 and the backward-inclination determination value Pd_th2 are corrected by use of the average value. This method makes it possible that even when the drivers are changed, the appropriate forward-inclination determination value Pd_th1 and backward-inclination determination value Pd_th2 are automatically set.

The driving-assistance control apparatus according to the present disclosure can be applied to various kinds of vehicles. It may be allowed that the vehicle driving source is not only an internal combustion engine but a hybrid type in which an internal combustion engine and a motor are combined with each other.

Although the present application is described above in terms of various exemplary embodiments and implementations, it should be understood that the various features, aspects and functions described in one or more of the individual embodiments are not limited in their applicability to the particular embodiment with which they are described, but instead can be applied, alone or in various combinations to one or more of the embodiments. Therefore, an infinite number of unexemplified variant examples are conceivable within the range of the technology disclosed in the present disclosure. For example, there are included the case where at least one constituent element is modified, added, or omitted and the case where at least one constituent element is extracted and then combined with constituent elements of other embodiments.

What is claimed is:

1. A driving-assistance control apparatus comprising:
   a memory storing instructions; and
   at least one hardware processor configured to implement:
      a straight-running determinator that determines whether or not a vehicle is running straight;
      a head-position detector that detects a head position of a driver;
      a driving-posture determinator that determines a posture of the driver, based on the head position detected by the head-position detector; and
      a driving-assistance processor that performs acceleration preparation control for raising a reaction speed for acceleration operation or deceleration preparation control for raising a reaction speed for deceleration operation in accordance with an output of the driving-posture determinator, when the straight-running determinator determines that the vehicle is running straight, wherein at least one of:
         when based on an output of the driving-posture determinator, determining that the posture of the driver is a forward-inclined posture, the driving-assistance processor performs the acceleration preparation control, and
         when based on an output of the driving-posture determinator, determining that the posture of the driver is a backward-inclined posture, the driving-assistance processor performs the deceleration preparation control.

2. The driving-assistance control apparatus according to claim 1, wherein determining that the posture of the driver has continuously been the forward-inclined posture during a predetermined acceleration-preparation control ending time, the driving-assistance processor ends the acceleration preparation control.

3. The driving-assistance control apparatus according to claim 1, wherein the acceleration preparation control by the driving-assistance processor is to increase an intake air amount of an internal combustion engine.

4. The driving-assistance control apparatus according to claim 3, wherein the acceleration preparation control by the driving-assistance processor is not only to increase the intake air amount of the internal combustion engine but to perform control so that an ignition timing is delayed or to perform control so that an air-fuel ratio of a fuel-air mixture to be supplied to the internal combustion engine becomes lean.

5. The driving-assistance control apparatus according to claim 1, wherein the acceleration preparation control by the driving-assistance processor is to increase a flow rate of a fuel pump.

6. The driving-assistance control apparatus according to claim 1, wherein the acceleration preparation control by the driving-assistance processor is to change a transmission ratio of a transmission.

7. The driving-assistance control apparatus according to claim 1, wherein determining that the posture of the driver has continuously been the backward-inclined posture during a predetermined deceleration-preparation control ending time, the driving-assistance processor ends the deceleration preparation control.

8. The driving-assistance control apparatus according to claim 1, wherein the deceleration preparation control by the driving-assistance processor is to decrease an intake air amount of an internal combustion engine.

9. The driving-assistance control apparatus according to claim 8, wherein the deceleration preparation control by the driving-assistance processor is not only to decrease the intake air amount of the internal combustion engine but to perform control so that an ignition timing is advanced or to perform control so that an air-fuel ratio of a fuel-air mixture to be supplied to the internal combustion engine becomes rich.

10. The driving-assistance control apparatus according to claim 1, wherein the head-position detector detects the head position of the driver by means of a head-position indicator provided on a helmet.

11. The driving-assistance control apparatus according to claim 10, wherein based on an electric-wave strength and an electric-wave reception angle between the head-position indicator and a head-position sensor provided in a vehicle, the head-position detector detects the head position of the driver.

12. The driving-assistance control apparatus according to claim 1, wherein in the case where a value of a roll angle indicating a rotation angle around an anteroposterior-direction axis that passes through the gravity center of the vehicle is within a predetermined determination roll angle, the straight-running determinator determines that the vehicle is running straight.

13. The driving-assistance control apparatus according to claim 1,
   wherein the driving-posture determinator calculates a left-and-right posture moving angle indicating a posture movement in a left-and-right direction of the driver with respect to a vertical-direction center line of the vehicle, and
   wherein in the case where the value of the left-and-right posture moving angle calculated by the driving-posture determinator is within a predetermined determination left-and-right posture moving angle, the straight-running determinator determines that the vehicle is running straight.

14. The driving-assistance control apparatus according to claim 13, wherein the driving-posture determinator calculates, as the left-and-right posture moving angle, an angle between the vertical-direction center line of the vehicle and a projection line of a head-position straight line, which connects the head position detected by the head-position detector with a reference position provided in the vehicle, on a plane perpendicular to the anteroposterior-direction axis of the vehicle.

15. The driving-assistance control apparatus according to claim 1, wherein the driving-posture determinator calculates a head-vehicle distance, which is a distance between the head position detected by the head-position detector and the reference position provided in the vehicle, and then determines which one of the forward-inclined posture, a basic posture, and the backward-inclined posture the posture of the driver is, based on comparisons between the head-vehicle distance and a predetermined forward-inclination determination value and between the head-vehicle distance and a predetermined backward-inclination determination value.

16. The driving-assistance control apparatus according to claim 15, wherein the driving-posture determinator corrects the forward-inclination determination value and the backward-inclination determination value, based on at least one of the height of the driver, the sitting height of the driver, and the average value of the detected head-vehicle distances.

* * * * *